United States Patent
Drummond et al.

(10) Patent No.: US 7,314,514 B2
(45) Date of Patent: Jan. 1, 2008

(54) ELECTROLYTE FOR AN ENERGY STORAGE DEVICE

(75) Inventors: Calum John Drummond, New South Wales (AU); Hung Chi Nguyen, New South Wales (AU); Timothy Lawrence Wade, New South Wales (AU)

(73) Assignee: Cap-XX Limited, NSW (AU)

( * ) Notice: Subject to any disclaimer, the term of this patent is extended or adjusted under 35 U.S.C. 154(b) by 269 days.

(21) Appl. No.: 10/508,158

(22) PCT Filed: Mar. 19, 2003

(86) PCT No.: PCT/AU03/00334

§ 371 (c)(1), (2), (4) Date: Sep. 17, 2004

(87) PCT Pub. No.: WO03/079381

PCT Pub. Date: Sep. 25, 2003

(65) Prior Publication Data

US 2005/0211136 A1 Sep. 29, 2005

(30) Foreign Application Priority Data

Mar. 19, 2002 (AU) .................................... PS1195

(51) Int. Cl.
*C08K 5/32* (2006.01)
*C08K 5/09* (2006.01)
*C08K 5/109* (2006.01)
(52) U.S. Cl. ..................................... 106/311; 252/364
(58) Field of Classification Search ............. 106/311; 252/364
See application file for complete search history.

(56) References Cited

U.S. PATENT DOCUMENTS

| 4,664,830 A | 5/1987 | Shinozaki et al. ......... 252/62.2 |
| 4,810,400 A | 3/1989 | Shinozaki et al. ......... 252/62.2 |

(Continued)

FOREIGN PATENT DOCUMENTS

JP 52-071630 * 6/1977

(Continued)

OTHER PUBLICATIONS

General Chemistry Principles and Modern Applications, 3rd Ed. Petrucci, pp. 294-298, 1982.*

(Continued)

*Primary Examiner*—C. Melissa Koslow
(74) *Attorney, Agent, or Firm*—Kenyon & Kenyon LLP

(57) ABSTRACT

The invention relates to energy storage devices such as capacitors and supercapacitors and non-aqueous solvent systems suitable for use as an electrolyte solvent therein. Devices incorporating the solvent system are suitable for use in, for example, wireless devices or automotive applications at high temperatures with minimal, if any mass loss. The solvent system has at least one low boiling component (preferably a nitrile, eg acetonitrile) at least one high boiling component compatible with said low boiling component (preferably lactones, eg γ-butyrolactone and/or organic carbonates eg ethylene carbonate or propylene carbonate); and wherein the components are selected in an amount such that said non-aqueous solvent system does not boil at the boiling point of the low viscosity solvent alone but has a boiling point greater than said low viscosity solvent alone.

3 Claims, 33 Drawing Sheets

U.S. PATENT DOCUMENTS

| | | | | |
|---|---|---|---|---|
| 4,830,785 | A | 5/1989 | Shinozaki et al. | 252/62.2 |
| 4,885,115 | A * | 12/1989 | Yokoyama et al. | 252/62.2 |
| 5,326,657 | A | 7/1994 | Suga et al. | 429/192 |
| 5,750,284 | A * | 5/1998 | Pendalwar et al. | 429/328 |
| 5,909,356 | A | 6/1999 | Hirabayashi et al. | 361/523 |
| 5,953,204 | A | 9/1999 | Suhara et al. | 361/502 |
| 5,965,054 | A | 10/1999 | McEwen et al. | 252/62.2 |
| 6,045,951 | A | 4/2000 | Wendsjö et al. | 429/307 |
| 6,166,899 | A | 12/2000 | Tamamitsu | 361/504 |
| 6,256,190 | B1 | 7/2001 | Wei et al. | 361/502 |
| 6,277,525 | B1 | 8/2001 | Yamamoto et al. | 429/326 |
| 6,296,973 | B1 | 10/2001 | Michot et al. | 429/300 |

FOREIGN PATENT DOCUMENTS

| | | | |
|---|---|---|---|
| JP | 04-026075 | * | 2/1992 |
| WO | WO 99/53510 | | 10/1999 |
| WO | WO 98/54739 | | 12/1999 |
| WO | WO 00/16352 | | 3/2000 |
| WO | WO 00/34964 | | 6/2000 |
| WO | WO 01/04920 | | 2/2001 |
| WO | WO 01/09058 | | 11/2001 |
| WO | WO 02/47097 | | 6/2002 |
| WO | WO 02/47099 | | 6/2002 |

OTHER PUBLICATIONS

Ue, Makolo et al, "*Electrochemical Properties of Organic Liquid Electrolytes Based on Quaternary Onium Salts for Electrical Double-Layer Capacitors*," J. Electrochem. Soc., vol. 141, No. 11, Nov. 1994.

* cited by examiner

Room Temperature
Conductivity (mS/cm)

Series "Y" shown in boldface
Series "X" shown in *italics*
Series "Z" shown in underline Room Temperature ESR (°C)

Series "Y" shown in boldface
Series "X" shown in *italics*
Series "Z" shown in underline Boiling Point Room Temperature ESR Series "Y" shown in boldface
Series "X" shown in italics

ELECTROLYTE FOR AN ENERGY STORAGE DEVICE

This application is a 371 national phase application of PCT/AU03/00334 filed on 19 Sep. 2003, claiming priority to PS1195 filed 19 Mar. 2002, the contents of which are incorporated herein by reference in their entirety.

TECHNICAL FIELD

The invention relates to electrolytes for use in energy storage devices. In particular, the invention relates to non-aqueous electrolytes capable of high temperature operation in capacitors and supercapacitors.

The invention has been developed primarily for supercapacitors and will be described hereinafter with reference to that application. It will be appreciated, however, that the invention is not limited to that particular field of use and is also suitable for other energy storage devices such as batteries, fuel cells, pseudocapacitors and capacitors and hybrids of one or more of these devices.

BACKGROUND ART

Supercapacitors, alternatively known as ultracapacitors, electrical double layer capacitors or electrochemical capacitors, are energy storage devices that have considerably more specific capacitance than conventional capacitors. Low resistance supercapacitors are ideally suited for high power applications for mobile devices, particularly those using GSM (Global System for Mobile communication) and GPRS (General Packet Radio Service) wireless technologies.

Supercapacitors can play a role in hundreds of applications. The energy and power storage markets, where supercapacitors reside, are currently dominated by batteries and capacitors. It is well recognised that batteries are good at storing energy but compromise design to enable high power delivery of energy. It is also well recognised that capacitors enable fist (high power) delivery of energy, but that the amount of energy delivered is very low (low capacitance). Overlaying these limitations of existing batteries and capacitors against market demand reveals the three main areas of opportunity for supercapacitors, battery replacement, devices which have higher energy density, bad complements, devices which have high power and energy densities; and capacitor replacement, devices which are smaller and not only have high power density but have high frequency response.

Currently, the relatively high power density of supercapacitors make them ideal for parallel combination with batteries that have high energy density to ram a hybrid energy storage system. When a load requires energy that is not constant, complementing the battery with a supercapacitor allows the peaks to be drawn from the charged-up supercapacitor. This reduces tie load on the battery and in many cases extends the lifecycle of a battery as well as the lifetime of rechargeable batteries.

Modern mobile devices require power systems that arm capable of dealing with large fluctuations in the load. For example, a mobile telephone has a variety of modes each with a different load requirement. There is a stand-by mode, which requites low power and is relatively constant. However, this mode is periodically punctuated by the need to find the nearest base station and a signal is sent and received, requiring a higher load. In full talk mode where continuous contact to a base station is required, the load takes the form of a periodic signal where the instantaneous load is quite different from the average. A number of communication protocols exist, such as GSM and GPRS, but they are all characterized with a periodic load. The parallel supercapacitor-batty hybrid is particularly suited to this application because the power from the supercapacitor is used during the high loads that are usually short in duration and the energy from the battery can recharge the supercapacitor and supply a base load during the time of low power demand. As further miniaturization of digital wireless communication devices occur, leading to decreased battery sizes, the need for supercapacitors will increase.

Supercapacitors also have application in the field of Hybrid Electric Vehicles (HEV). Supercapacitors can be used as an integral component of the drivetrains of these vehicles and are used as the primary power source during acceleration and for storage of energy reclaimed during regenerative braking. Such vehicles could conceivably halve a motorist's fuel bill and slash emissions by up to 90%.

Capacitance arises when two parallel plates are connected to an external circuit and a voltage difference is imposed between the two plates, the surfaces become oppositely charged. The fundamental relationship for this separation of charges is described by the following equation $$C = \frac{\varepsilon A}{L}$$

where C denotes capacitance with a unit of farads (F), $\varepsilon$ is the permittivity with a unit of farads per metre (m), A is the area of overlap of the charged plates and L is the separation distance. The permittivity of the region between the plates is related to the dielectric constant of the material that can be used to separate the charged surfaces.

The problem with exiting commercial capacitors using conventional materials is that their performance is limited by their dimensions. For example, a capacitor based around a metallized coating of a polyethylene sheet that is 50 μm thick will develop only 0.425 μF for one square metre of capacitor. Thus, over 2.3 million square metres will be required to develop 1 F.

The supercapacitors developed by the present applicant are disclosed in detail in the applicants copending applications, for example, PCT/AU98/00406, PCT/AU99/00278, PCT/AU99/00780, PCT/AU99/01081, PCT/AU00/00836 and PCT/AU01/00553, the contents of which are incorporated herein by reference.

These supercapacitors developed by the applicant overcome the dimensionality problem described above by using as a coating material an extremely high surface area carbon.

These supercapacitors include two opposed metal electrodes. These electrodes are coated and are maintained in a predetermined spaced apart electrically isolated configuration by an intermediate electronically insulating separator. In very broad terms, the electrodes form current collectors for the coating material, in that the metal offers significantly less resistance than the coating material. The coatings typically formed from a particulate carbon or carbons and a binder used for adhering the carbon to itself and to the associated current collector.

The coated electrodes and intermediate separator can be either stacked or wound together and disposed within a housing that contains an electrolyte. Two current collecting terminals are then connected to and extend from respective electrodes for allowing external access to those electrodes.

The housing is sealed to prevent the ingress of contaminants and the egress of the electrolyte. This allows advantage to be take of the electrical double layer that forms at the interface between the electrodes and the electrolyte. That is, there are two interfaces, those being formed between the respective electrodes and the electrolyte. This type of energy storage device is known as a supercapacitor. Alternatively, these have been known as ultracapacitors, electrical double layer capacitors and electrochemical capacitors.

The electrolyte contains ions that are able to freely move throughout a matrix, such as a liquid or a polymer, and respond to the charge developed on the electrode surface. The double layer capacitance results from the combination of the capacitance due to the compact layer (the layer of solvated ions densely packed at the surface of the electrode) and the capacitance due to the diffuse layer (the less densely packed ions further from the electrode).

In supercapacitors, the compact layer is generally very thin, less than a nanometre, and of very high surface area. This is where the technological advantage for supercapacitors over conventional capacitors lies, as charge storage in the extremely thin compact layer gives rise to specific capacitances of approximately 0.1 $Fm^{-2}$. This is an increase by several hundred thousand-fold over conventional film capacitors. As well, the applied potential controlled, reversible nanoscale ion adsorption/desorption processes result in a rapid charging/discharging capability for supercapacitors.

The electrode material may be constructed as a bed of highly porous carbon particles with a very high surface area. For example, surface areas may range from 100 $m^2$ per gram up to greater than 2500 $m^2$ per gram in certain preferred embodiments. The colloidal carbon matrix is held together by a binding material that not only holds the carbon together (cohesion) but it also has an important role in holding the carbon layer onto the surface of the current collecting substrate (adhesion).

The current collecting substrate is generally a metal foil. The space between the carbon surfaces contains an electrolyte (frequently solvent with dissolved salt). The electrolyte is a source of ions which is required to form the double layer on the surface of the carbon as well as allowing ionic conductance between opposing electrodes. A porous separator is employed to physically isolate the carbon electrodes and prevent electrical shorting of the electrodes.

The energy storage capacity for a supercapacitor can be described by the equation $$E = \frac{1}{2}CV^2$$

where E is the energy in joules and V is the rated or operating voltage of the supercapacitor. Apart from the voltage limitation, it is the size of the supercapacitor that controls the amount of energy stored, and the distinguishing feature of supercapacitors are the particularly high values of capacitance. Another measure of supercapacitor performance is the ability to store and release the energy rapidly; this is the power, P, of a supercapacitor and is given by $$P = \frac{V^2}{4R}$$

where R is the internal resistance of the supercapacitor. For capacitors, it is more common to refer to the internal resistance as the equivalent series resistance or ESR. As can be deduced from the foregoing equations, the power performance is controlled by the ESR of the entire device, and this is the sum of the resistance of all the materials, for instance, substrate, carbon, binder, separator, electrolyte and the contact resistances as well as between the external contacts.

One variable of interest in the field of supercapacitors that has yet to be fully explored is the nature of the electrolyte involved. The electrolyte is typically one or more solvents containing one or more dissolved ionic species. In many cases, the physical and electrochemical properties of electrolyte are a key factor in determining the internal resistance (ESR) of the supercapacitor and the "power spectrum" of the supercapacitor, ie the ability of the supercapacitor to provide power over various time domains or in various frequency ranges.

The factors influencing the conductance ($\kappa$) of an electrolyte solution are described in detail in an article by B. E. Conway taken from "The Fourth International Seminar on Double Layer Capacitors and Similar Energy Storage Devices", Dec. 12-14, 1994, held at Ocean Resort Hotel and Conference Centre, Deerfield Beach, Fla. and co-ordinated by Florida Educational Seminars, Inc., 1900 Glades Road, Suite 358, Boca Raton, Fla. 33431.

In summary, there are two principle factors which are involved in determining the conductance—these are:
a) the concentration of free charge carriers, cations and anions; and
b) the ionic mobility or conductance contribution per dissociated ion in the electrolyte.

There are a number of sub factors which in turn influence these two principle factors. These are:
The solubility of the selected salt.
The degree of dissociation into free ions and factors such as the extent of ion-pairing of the ionic species. This in turn is influenced by the salt concentration, temperature and the dielectric constant of the solvent.
The viscosity of the solvent, which is a temperature dependent property. As temperature increases, there is a corresponding decrease in viscosity.

Solvents for supercapacitors can thus be designed with the following criteria in mind:
Solvent for selected ionic species
Degree of dissociation of cation/anion pairing in solution
Dielectric constant
Electron-pair donicity
Permits high ion mobility
Extent of solvation of free ions and radii of solvated ions
Temperature coefficient of viscosity (ie low viscosity in the intended temperature range) and ion pairing equilibria.

There is also the necessity for the solvent to be chemically stable. Aqueous based electrolytes, such as sulfuric acid and potassium hydroxide solutions, are often used as they enable production of an electrolyte with high conductivity. However, water is susceptible to electrolysis to hydrogen and oxygen on charge and as such has a relatively small electrochemical window of operation outside of which the applied voltage will degrade the solvent. In order to maintain electrochemical stability in applications requiring a voltage in excess of 1.5V, it is necessary to employ supercapacitor cells in series, which leads to an increase in size in relation to non-aqueous devices. Stability is important when one considers that the supercapacitors must charge and discharge many hundreds of thousands of times during the operational lifetime of the supercapacitor.

There are of course processing requirements on the solvent also, such as cost, toxicity, purity and dryness considerations.

Non aqueous solvents commonly used in related fields, eg batteries, can be classified as: high dielectric constant aprotic (e.g. organic carbonates), low dielectric constant with high donor number (e.g. dimethoxyethane, tetrahydrofuran or dioxolane), low dielectric constant with high polarisability (e.g. toluene or mesitylene) or intermediate dielectric constant aprotic (e.g. dimethylformamide, butyrolactone) solvents.

However, in addition to the specific electrolyte requirements of supercapacitors mentioned above, there is also the practical consideration that supercapacitors do not operate in isolation. Rather, in use, they are in confined environments in the presence of components which generate high temperatures, and like the other components, this must be borne in mind when selecting the electrolyte solvent. Also, it needs to be borne in mind that the supercapacitors must be capable of operation at start-up at temperatures much lower (even into the sub zero range) than the high operating temperatures referred to above.

The energy storage of batteries, in contrast to the power delivery of supercapacitors, is not critically dependent on the contribution of the electrolyte to the ESR of the cell, although even in batteries, low ESR is desirable. Solvents which have high boiling points invariably have high viscosities, and consequently, low charge mobilities at low temperatures. High boiling solvents, such as cyclic ethers and lactones can therefore be used in batteries with less regard to what would be an unacceptably high ESR in supercapacitors.

FIG. 1 shows the relationship between literature boiling point and viscosity for a number of substances.

FIG. 2 shows the relationship between conductivity and reciprocal solvent viscosity at 25° C. for 0.65M tetraethylammonium tetrafluoroborate (TEATFB) for a variety of solvents. Source: Makoto Ue, Kazuhiko Ida and Shoichiro Mori; "*Electrochemical Properties of Organic Liquid Electrolytes Based on Quaternary Onium Salts for Electrical Double-Layer Capacitors.*" J. Electrochem. Soc., Vol. 141, No. 11, November 1994

FIG. 3 is a plot of ESR and reciprocal conductivity, where the conductivity is varied by changing the concentration of TEATFB in acetonitrile, and shows in a general way the relationship between ESR and conductivity for a supercapacitive cell.

These three Figures also serve to illustrate the other relationships that exist between the properties, such as boiling point and ESR, viscosity and ESR and boiling point and conductivity.

Admixing a low boiling fluid and a high boiling fluid may appear to be an attractive option, with the low boiling, low viscosity compound providing acceptable charge mobility at the low end of the temperature range, and the high boiling component reducing in viscosity and providing charge mobility at higher temperatures. In practice, however, this approach is generally not viable because while acceptable results may be achieved at ambient temperatures, at higher temperatures the low boiling component will fractionate out. Fractionation can present a challenge to the mechanical integrity of the supercapacitor packaging.

It is an object of the present invention to provide a non-aqueous solvent suitable for use in the energy storage device which overcomes one or more of the abovementioned disadvantages, or at least provides a commercially viable alternative.

SUMMARY OF THE INVENTION

According to a first aspect, the invention provides a non-aqueous solvent system suitable for use as an electrolyte solvent in an energy storage device, said non aqueous solvent system including:
at least one low boiling component,
at least one high boiling component compatible with said low boiling component; and
wherein the components are selected in an amount such that said non-aqueous solvent system does not boil at the boiling point of the low viscosity solvent alone but has a boiling point greater than said low viscosity solvent alone.

Alternatively, the invention may be described as providing a non-aqueous solvent system suitable for use in an energy storage device including a plurality of compatible component solvents each with a corresponding component solvent boiling point, and wherein the non-aqueous solvent system has at least one boiling point not corresponding to a component solvent boiling point.

Preferably the energy storage device is a supercapacitor. More preferably, the energy storage device is a carbon based supercapacitor, that is, a supercapacitor that has carbon as a component of the electrodes.

The energy storage devices of the present invention may be in the form of cells or devices, and may include a number of cells in series or parallel.

Preferably, the non-aqueous solvent system is a combination of a low viscosity solvent and one or more compatible high viscosity solvents.

Preferably the low viscosity/low boiling component is a nitrile, most preferably acetonitrile ("AN").

The high viscosity/high boiling component is preferably one or more of a lactone, such as γ-butyrolactone ("GBL"), or an organic carbonate such as ethylene carbonate ("EC"), propylene carbonate ("PC") or mixtures or derivatives thereof.

Preferably, the species are complexed or associated and provide a synergistic change in boiling point. Preferably, the species are in a mole ratio selected to provide an electrolyte solvent with a boiling point different from the boiling point of the low viscosity solvent.

In one preferred embodiment, the sum of the moles of the low boiling components is less than the sum of the moles of the high boiling components. In an alternative preferred embodiment, the sum of the moles of the low boiling components is equal to the sum of the moles of the high boiling components. In another alternative preferred embodiment, the sum of the moles of the low boiling components is greater than the sum of the moles of the high boiling components.

In a preferred embodiment, the invention provides a non-aqueous solvent system suitable for use as an electrolyte solvent in an energy storage device, said non aqueous solvent system including:
a nitrile,
at least one of a lactone or a carbonate compatible with said nitrile; and wherein the components are selected in an amount such that said non-aqueous solvent system does not boil at the boiling point of the nitrile but has a boiling point greater than the boiling point of the nitrile.

In one particularly preferred embodiment, the invention provides a non-aqueous solvent system including acetonitrile, γ-butyrolactone, and ethylene carbonate. Even more preferably, the invention provides a non-aqueous solvent system including acetonitrile, γ-butyrolactone, and ethylene carbonate in a mole ratio of 3:2:1 to 3:1.72:1.

In another particularly preferred embodiment, the invention provides a non-aqueous solvent system including acetonitrile, γ-butyrolactone, and propylene carbonate. Even more preferably, the invention provides a non-aqueous solvent system including acetonitrile, γ-butyrolactone, and propylene carbonate in a mole ratio of 3:2:1 to 3:1.72:1.

In yet another particularly preferred embodiment, the invention provides a non-aqueous solvent system including acetonitrile, propylene carbonate and ethylene carbonate. Even more preferably, the invention provides a non-aqueous solvent system including acetonitrile, propylene carbonate and ethylene carbonate in a ratio of 2:1:1.

Other preferred embodiments include 2AN:GBL:PC and 2AN:GBL:EC

Without wishing to be limited to the particular solvents which may be used, the high boiling high viscosity solvents and/or low boiling low viscosity solvents may be selected independently from the following list. It will be understood that high boiling and low boiling, and likewise high viscosity and low viscosity, are relative terms and represent properties of the component solvents relative to one another.

Suitable solvents include: ethylene carbonate, propylene carbonate, butylene carbonate, γ-butyrolactone, γ-valerolactone, acetonitrile, glutaronitrile, adiponitrile, methoxyacetonitrile, 3-methoxypropionitrile, N,N-dimethylformamide, N,N-dimethylacetamide, N-methypyrrolidinone, N-methyloxazolidinone, N-N'-dimethylimisazolidinone, nitromethane, nitroethane, sulfolane, dimethyl sulfoxide, trimethyl phosphate, 1,2-dimethoxyethane, tetrahydrofuran, 2-methyltetrahydrofuran, 1,3-dioxolane, 4-methyl-1,3-dioxolane, methyl formate, methyl acetate, methyl propionate, dimethyl carbonate, ethyl methyl carbonate, diethyl carbonate, methyl propyl carbonate, 1-methyl-2-pyrrolidone, 1,2-dichloroethane, sulphuryl chloride, thionyl chloride, acetyl chloride, tetrachloroethylene carbonate, benzoyl chloride, dichloroethylene carbonate, nitrobenzene, acetic anhydride, phosphorus oxychloride, benzonitrile, selenium oxychloride, propanediol-1,2-carbonate, benzylcyanide(nitrile), ethylene sulphite, iso-butyronitrile, propionitrile, phenylphosphonic difluoride, n-butyronitrile, acetone, ethyl acetate, phenylphosphonic dichloride, diethyl ether, diphenyl phosphonic chloride, trimethyl phosphate, tributyl phosphate, pyridine, hexamethyl phosphoramide and the like.

The non-aqueous solvent systems of the present invention have a boiling point of at least 85° C., more preferably at least 90° C. and even more preferably at least 100° C.

Preferably, the non-aqueous solvent systems of the present invention further include an ionic species at least partially soluble therein, such as a salt, which may be in one preferred embodiment tetraethylammonium tetrafluoroborate. The ionic species may be present in an amount up to saturation, or in greater or lesser quantities such as 1 molar and in an amount sufficient to allow an energy storage device to function over the desired temperature range.

Preferably, the non-aqueous solvent systems of the present invention include an ion source. The ion source may be present in an amount up to saturation at −30° C. or in an amount up to saturation at any temperature, having regard to the operational requirements of the device. Tetraethylammonium tetrafluoroborate is particularly preferred. In one highly preferred embodiment, a 1 molar (at ~23° C.) solution of tetraethylammonium tetrafluoroborate in the solvents of the present invention have a conductivity of at least 40 mS/cm at 85° C., more preferably at least 50 mS/cm at 85° C., even more preferably at least 55 mS/cm at 85° C. and most preferably at least 60 mS/cm at 85° C. It is preferable that the non aqueous systems of the present invention are suitable four use as high temperature solvents and/or low temperature solvents.

According to a second aspect, the invention provides a method of increasing the boiling point of a non-aqueous low boiling low viscosity solvent suitable for use in an energy storage device, said method including the step of combining said non-aqueous low boiling low viscosity solvent with at least one compatible high boiling high viscosity solvent.

According to a third aspect, the invention provides a method of decreasing the viscosity of a high boiling high viscosity solvent suitable for use in an energy storage device, said method including the step of combining said high boiling high viscosity solvent with at least one compatible second liquid.

According to a fourth aspect, the invention provides a method of increasing the useful operational temperature range of a solvent suitable for use in an energy storage device, said method including the step of combining a low boiling low viscosity solvent with at least one compatible high boiling high viscosity solvent.

According to a fifth aspect, the invention provides a high temperature solvent suitable for use in an energy storage device, said high temperature solvent including acetonitrile, γ-butyrolactone and ethylene carbonate. In an alternative embodiment, the high temperature solvent includes acetonitrile, γ-butyrolactone and propylene carbonate. A further alternative embodiment of the high temperature solvent includes acetonitrile, propylene carbonate and ethylene carbonate.

According to a sixth aspect, the invention provides a low temperature solvent suitable for use in an energy storage device, said low temperature solvent including acetonitrile, γ-butyrolactone and ethylene carbonate. In an alternative embodiment, the low temperature solvent includes acetonitrile, γ-butyrolactone and propylene carbonate. A further alternative embodiment of the low temperature solvent includes acetonitrile, propylene carbonate and ethylene carbonate.

According to a seventh aspect, the invention provides an energy storage device including the non-aqueous solvent system of the present invention. In one preferred embodiment the device includes acetonitrile, γ-butyrolactone and ethylene carbonate.

In an alternative embodiment, the energy storage device may include a solvent including acetonitrile, γ-butyrolactone and propylene carbonate. A further alternative embodiment of the energy storage device may include a solvent including acetonitrile, propylene carbonate and ethylene carbonate.

Preferably the energy storage device is a capacitor or supercapacitor.

According to an eighth aspect, the invention provides a method of predetermining the ESR of an energy storage device at a predetermined temperature, said method including the step of providing to the energy storage device a solvent system including at least one low boiling component, at least one high boiling component compatible with said low boiling component; and wherein the components are selected in an amount such that said non-aqueous solvent system does not boil at the boiling point of the low viscosity solvent alone but has a boiling point greater than said low viscosity solvent alone.

According to a ninth aspect, the invention provides a method of predetermining the conductivity of an energy storage device at a predetermined temperature, said method including the step of providing to the energy storage device a solvent system including at least one low boiling component, at least one high boiling component compatible with said low boiling component; and wherein the components are selected in an amount such that said non-aqueous solvent system does not boil at the boiling point of the low viscosity solvent alone but has a boiling point greater than said low viscosity solvent alone.

The preferred solvent systems include, but are not limited to: acetonitrile, γ-butyrolactone and ethylene carbonate; acetonitrile, γ-butyrolactone and propylene carbonate or acetonitrile, ethylene carbonate and propylene carbonate.

According to a tenth aspect, the invention provides a supercapacitor having an ESR of no more than 1013 mΩ $cm^2$ at 23° C., preferably no more than 862 mΩ $cm^2$ at 23° C. and even more preferably no more than 449 mΩ $cm^2$ at 23° C. and an ESR of no more than 7840 mΩ cm at −30° C., preferably no more than 3685 mΩ $cm^2$ at −30° C. and even more preferably no more than 986 mΩ $cm^2$ at −30° C.

Where ESR is described in terms of resistance multiplied by unit area, it will be understood by those skilled in the art that this refers to the geometric area of the current collector. Also, in those cases where the devices have differently sized current collectors, it will be understood that the resistance values relate to the area of the smallest current collector.

According to an eleventh aspect, the invention provides a supercapacitor having an ESR of no more than 784 mΩ $cm^2$ at −85° C., preferably no more than 670 mΩ $cm^2$ at 85° C. and even more preferably no more than 508 mΩ $cm^2$ at 85° C. and an ESR of no more than 7840 mΩ $cm^2$ at −30° C., preferably no more than 3685 mΩ $cm^2$ at −30° C. and even more preferably no more than 778 mΩ $cm^2$ at −30° C.

According to a twelfth aspect, the invention provides a supercapacitor having an ESR of no more than 784 mΩ $cm^2$ at 85° C., preferably no more than 670 mΩ $cm^2$ at 85° C. and even more preferably no more than 508 mΩ $cm^2$ and an ESR of no more than 946 mΩ $cm^2$ at 23° C. and preferably no more than 862 mΩ $cm^2$ at 23° C. and even more preferably no more than 449 mΩ $cm^2$ at 23° C.

According to a thirteenth aspect, the invention provides a supercapacitor having an ESR of no more than 784 mΩ $cm^2$ at 85° C. and preferably no more than 670 mΩ $cm^2$ at 85° C. and even more preferably no more than 508 mΩ $cm^2$ at 85° C. and an ESR of no more than 946 mΩ $cm^2$ at 23° C., preferably no more than 862.4 mΩ $cm^2$ at 23° C. and even more preferably an ESR of no more than 544 mΩ $cm^2$ at 23° C. and an ESR of no more than 7840 mΩ $cm^2$ at −30° C. and preferably no more than 3685 mΩ $cm^2$ at −30° C. and even more preferably no more than 778 mΩ $cm^2$ at −30° C.

According to a fourteenth aspect, the invention provides a supercapacitor having an ESR of no more than 771 mΩ $cm^2$ at 80° C., preferably no more than 424 mΩ $cm^2$ at 80° C.

According to a fifteenth aspect, the invention provides a supercapacitor having an ESR of no more than 741 mΩ $cm^2$ at 90° C., preferably no more than 412 mΩ $cm^2$ at 90° C.

According to a sixteenth aspect, the invention provides a supercapacitor having an ESR of no more than 717 mΩ $cm^2$ at 100° C., preferably no more than 401 mΩ $cm^2$ at 100° C.

According to a seventeenth aspect, the invention provides a supercapacitor having an ESR of no more than 675 mΩ $cm^2$ at 120° C., preferably no more than 382 mΩ $cm^2$ at 120° C.

According to an eighteenth aspect, the invention provides a supercapacitor having an ESR of no more than 657 mΩ $cm^2$ at 130° C., preferably no more than 373 mΩ $cm^2$ at 130° C.

According to a nineteenth aspect, the invention provides a supercapacitor having an ESR of no more than 641 mΩ $cm^2$ at 140° C., preferably no more than 366 mΩ $cm^2$ at 140° C.

The supercapacitors of the present invention may have any combination of one or more of the ESR/temperature relationships mentioned above.

In one highly preferred aspect of the invention, the supercapacitors have an ESR of no more than $(((1044.3/(0.3948*(T)+25.852))+6.5178)*28)$ [Series X with 50 μm Separator] and more preferably no more than $(((777.58/(0.3948*(T)+25.852))+6.741)*28)$ [Series Z with 50 μm Separator] and even more preferably no more than $(((649.32/(0.3948*(T)+25.852))+8.7202)*28)$ [Series Z with 20 μm Separator] where all units are in mΩ $cm^2$ at temperature T(° C.).

In an alternative aspect, where the device is a multilayer electrode stack device, as may be preferred in production cells, the ESR is preferably no more than $(((1051.2/(0.3948*(T)+25.852))+13.282)*24.4)$ mΩ $cm^2$.

These values are applicable for single cell devices. Where two or more cells are connected in series, a much higher value in mΩ $cm^2$ will be obtained.

Preferably, the supercapacitors are high temperature supercapacitors.

According to a twentieth aspect, the invention provides a supercapacitor having a non aqueous solvent system and an ESR at −30° C. of no more than. 7.4, more preferably no more than 4.5, even more preferably no more than 3.4 and most preferably no more than 2.0 times the ESR at −30° C. of a supercapacitor of identical construction but which contains acetonitrile as sole solvent.

The non aqueous solvent systems are preferably binary or ternary.

According to a twenty first aspect, the invention provides a supercapacitor having a non aqueous solvent system and an ESR at −20° C. of no more than 2.7, more preferably no more than 2.2, even more preferably no more than 2.1 times the ESR at −20° C. of a supercapacitor of identical construction but which contains acetonitrile as sole solvent.

According to a twenty second aspect, the invention provides a supercapacitor having a non aqueous solvent system and an ESR at 23° C. of no more than 1.8, more preferably no more than 1.5, even more preferably no more than 1.2 times the ESR at 23° C. of a supercapacitor of identical construction but which contains acetonitrile as sole solvent.

According to a twenty third aspect, the invention provides a supercapacitor having a non aqueous solvent system and an ESR at 50° C. of no more than 2.0, more preferably no more than 1.5, even more preferably no more than 1.4 times the ESR at 50° C. of a supercapacitor of identical construction but which contains acetonitrile as sole solvent.

According to a twenty fourth aspect the invention provides a supercapacitor having a non aqueous solvent system and an ESR at −30° C. of no more than 13.7, more preferably no more than 8.3, even more preferably no more than 6.4 and most preferably no more than 3.5 times the ESR at 23° C. of a supercapacitor of identical construction but which contains acetonitrile as sole solvent.

According to a twenty fifth aspect, the invention provides a supercapacitor having a non aqueous:solvent system and an ESR at −20° C. of no more than 4.4, more preferably no more than 3.6, even more preferably no more than 3.4 times the ESR at 23° C. of a supercapacitor of identical construction but which contains acetonitrile as sole solvent.

According to a twenty sixth aspect, the invention provides a supercapacitor having a non aqueous solvent system and an ESR at 50° C. of no more than 1.6, more preferably no more than 1.3 times the ESR at 23° C. of a supercapacitor of identical construction but which contains acetonitrile as sole solvent.

According to a twenty seventh aspect, the invention provides a supercapacitor having a non aqueous solvent system and an ESR at 85° C. of no more than 1.4, more preferably no more than 1.2, and most preferably no more than 1.1 times of the ESR at 23° C. of a supercapacitor of identical construction but which contains acetonitrile as sole solvent.

The supercapacitors of the present invention may have any or all of the relative performance properties of the tenth to twenty seventh aspects.

According to a twenty eighth aspect, the invention provides a method of selecting a solvent system for use in an electrical storage device including the steps of:
selecting a plurality of potential solvents;
preparing a primary, binary, ternary or higher order mixture of said potential solvents, optionally adding an ion source;
determining a property of said primary, binary, ternary or higher order mixture; preparing a phase diagram of said mixtures; and
identifying a solvent mixture adapted to provide a predetermined value of said property.

Preferably, the binary, ternary or higher order mixture includes at least one high boiling high viscosity solvent and at least one low boiling low viscosity solvent.

Preferably, the binary, ternary or higher order mixture is a combination of a low viscosity solvent and one or more compatible high viscosity solvents.

Preferably the low viscosity solvent is a nitrile, most preferably acetonitrile.

Preferably the high viscosity solvent is one or more of a lactone, such as y butyrolactone, or an organic carbonate such as ethylene carbonate, propylene carbonate or derivatives thereof.

Preferably, the given parameter is one or more of boiling point, conductivity, viscosity or ESR at a predetermined temperature.

According to a twenty ninth aspect the invention provides a supercapacitor, preferably of a multilayer soft packaging laminate design, which has a mass loss of no more than 3% of the room temperature mass on sustained heating at 100° C., preferably a mass loss of no more than 2% of the room,temperature mass and even more preferably a mass loss of no more than 1% of the room temperature mass. Sustained heating is preferably a period in excess of 2 hours continuous use.

According to a thirtieth aspect the invention provides a supercapacitor, preferably of a multilayer soft packaging laminate design, which has a mass loss of no more than 2% of the room temperature mass on sustained heating at 95° C., preferably a mass loss of no more than 1% of the room temperature mass and even more preferably a mass loss of no more than 0.5% of the room temperature mass. Sustained heating is preferably a period in excess of 3 hours continuous use.

According to a thirty first aspect the invention provides a supercapacitor, preferably of soft packaging laminate design, which has a mass loss of no more than 0.5% of the room temperature mass on sustained heating at 90° C. and even more preferably zero mass loss on sustained heating at 90° C. Sustained heating is preferably a period in excess of 4 hours continuous use.

According to a thirty second aspect, the invention provides a supercapacitor having an extrapolated ESR at infinite electrolyte conductivity ($ESR_\alpha$) of no more than 325 mΩ cm², more preferably no more than 189 mΩ cm² and most preferably no more than 147 mΩ cm².

In another aspect the invention relates to a device incorporating an energy storage device of the present invention. Such devices include, but are not limited to devices such as digital wireless devices, for example, mobile telephones. Devices of the present invention also include computers, and related combination devices which may be networked conventionally or in a wireless manner. Other devices are in the form of an electrical vehicle or hybrid electrical vehicle. It will be appreciated that the devices of the present invention are especially suited to those applications where high temperature use is expected, but where design considerations would render bulky "can" type supercapacitors unsuitable.

The energy storage devices of the present invention maybe used, for example, with a GPRS communications module for a cellular telephone, a GSM module, a Mobitex module, 3G module, a PCMCIA card, a Compact Flash card, a communications card or device for a notebook computer, a laptop computer or a Tablet computer, a wireless LAN device such as a desktop or other computer or any other wireless device.

Most preferably, the device of the present invention is a supercapacitor used as part of a power source in a PCMCIA card, especially a modem or fax modem card.

Preferably, when the energy storage device of the present invention are used with communications modules or cards, they are in the form of a supercapacitor having a plurality of supercapacitive cells. The cells are preferably connected in series and even more preferably, the cells are contained within the same package, although the cells may be contained within separate packages.

DESCRIPTION

Figure 1:
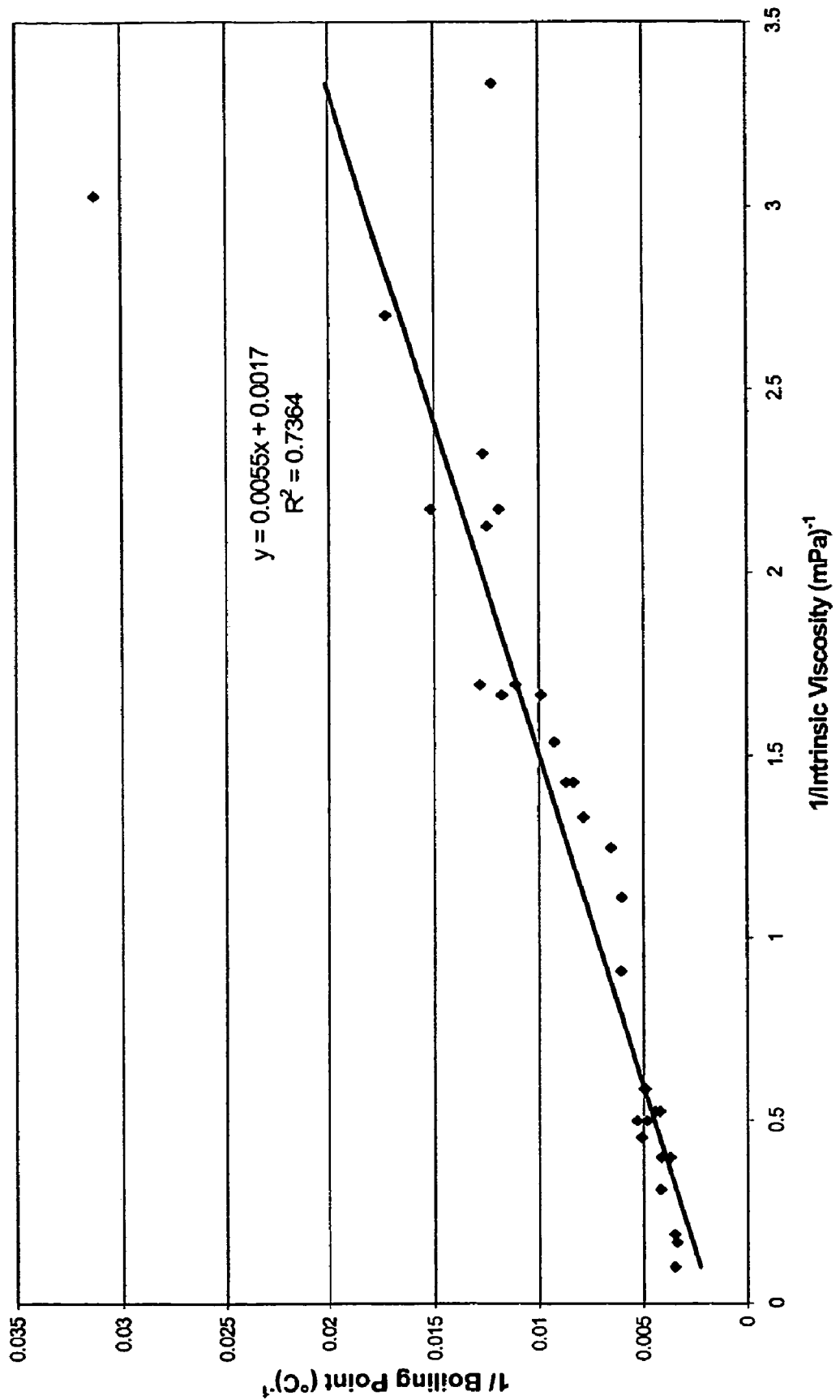
FIG. 1 shows a graph of 1/boiling point against 1/viscosity for a range of solvents.

The present invention is described with reference to the supercapacitors developed by the present applicant and disclosed in detail in the applicants copending applications, for example, PCT/AU98/00406, PCT/AU99/00278, PCT/AU99/00780, PCT/AU99/01081, PCT/AU00/00836 and PCT/AU01/00553. It will be understood by those skilled in the art that the present application uses those supercapacitors and that in the present instance, the solvent is the variable of interest. However, it will also be appreciated by those skilled in the art that the electrolyte solutions of the present application will be equally applicable for use in other energy storage devices of different design.

Acetonitrile (AN) is widely used as the sole solvent component of electrolyte systems because it has a high dielectric constant (38 at 20° C.) and a low viscosity (0.369 cP at 20° C.). A 1M solution of tetraethylammonium tetrafluoroborate has a room temperature conductivity of 55 mS/cm, which is around 2-5 times better than can be attained using most other single component organic solvents.

Acetonitrile also has a low freezing point and relatively low viscosity, making it suitable for low temperature applications. However, acetonitrile boils at 82° C. which means that at or above this temperature it is necessary to contain the vapour, and additional challenges need to be met in respect of ensuring the mechanical integrity of any packaging of devices which use AN at or above this temperature.

A thermogravimetric analysis of a supercapacitor cell containing acetonitrile made without any special consideration to containing high pressure shows a sudden and irreversible weight loss at 83° C. In some applications, an upper temperature limit of 80-85° C. is unsatisfactory, and higher temperatures (up to 95° C. and above) are required for prolonged periods.

As mentioned, it is important that the electrolyte has as high a conductivity and as low a contribution to device ESR as possible. High conductivity can be achieved primarily by using a low viscosity (or, in practical terms, low boiling) solvent, although in order for high conductivity, it is also necessary for the solvent to have a good dielectric constant to enable it to dissolve ionic species.

As mentioned above, simply employing a single compound with a higher boiling solvent is not desirable for various reasons. While a number of higher boiling solvents are available with good dielectric constants, they are invariably significantly more viscous than lower boiling solvents. Further, high viscosity solutions do not exhibit appropriate conductivities until much higher temperatures (where the viscosity is reduced). Thus, while these high temperature solvents are capable of good conductance at high temperature, they have unsatisfactorily high ESRs at ambient or subzero temperatures. To illustrate the problem, at room temperature the conductivity of acetonitrile is around 55 mS/cm while that of γ-butyrolactone (GBL) is only around 18 mS/cm. Conductivity increases with temperature but the conductivity of γ-butyrolactone does not approach the room temperature conductivity of acetonitrile until the temperature reaches 130° C. To those skilled in the art, admixing the two would not appear to produce a solution to the problem as acetonitrile, which boils around 80° C. would be expected to fractionate out of the mixture long before a suitable conductivity of γ-butyrolactone was achieved. Surprisingly, in the present case, such fractionation did not occur.

In particular, the present applicant has found that solvent blends, such as a blend of a nitrile, a lactone and a carbonate, and in particular acetonitrile, γ-butyrolactone and propylene carbonate (PC) or a blend of acetonitrile, γ-butyrolactone and ethylene carbonate (EC) or a blend of acetonitrile, propylene carbonate (PC) and ethylene carbonate (EC) produce a ternary solvent that has good conductivity, (and consequently a suitably low ESR) over a good temperature operating range, with high stability at elevated operational temperature, such as 85° C.

Without wishing to be bound by theory, it is believed that this stability at elevated temperatures is due to association between the species, i.e. rather than being a mere admixture which undergoes fractionation of the lower boiling components as temperature increases, an association between the species means that the acetonitrile does not fractionate out of the mixture. The fact that no fractionation occurred leads to the hypothesis that acetonitrile forms complexes with the other solvent molecules in the solution which results in the elevation of the acetonitrile boiling temperature, i.e. the formation of a new complex with a higher boiling point.

A 1M Tetraethylammonium tetrafluoroborate solution in a mole ratio of 3 acetonitrile: 1.72-2 γ-butyrolactone:1 ethylene carbonate mixture performed unexpectedly well in the tests as is illustrated in the examples. This ternary mixture had a boiling temperature of 109° C. with no fractionation of acetonitrile around its boiling point as would have been expected.

Thermo gravimetric analysis of supercapacitor test cells and devices containing 3 acetonitrile: 1.72 γ-butyrolactone:1 ethylene carbonate showed that the weight of the material remained constant up to at least 103° C. before sample loss occurred. It was highly significant that no sample loss commenced immediately above 82° C., the boiling point of acetonitrile. Such an observation bears out the hypothesis of some intermolecular interactions taking place.

Further, qualitative analysis of samples containing the ternary system, but with a significant mole excess of acetonitrile showed some fractionation, indicating that beyond a certain point, there was no further opportunity for complexation of the acetonitrile.

Further investigations as to the mechanism of the temperature elevation without fractionation were conducted and in particular whether or not it involved some solvation of the ionic species in solution. Depending on the solvent and particular ionic species, the addition of a dissolved salt can generally increase boiling temperature by around 1-3° C. per mole of ionic species. For example, the boiling point of another preferred ternary solvent (2AN:0.86 GBL:EC) of the present invention was around 107° C. without the salt. Adding a salt to a concentration of 1 M gave a boiling point of around 108-113° C., an increase of up to 6° C. This corresponds to a rise of up to 3° C. per mole of ionic species which is within the expected,limits.

By contrast, the difference between the boiling point of the mixture and the boiling point of pure acetonitrile is around 25° C. There is strong evidence that the mixture is more than merely an admixture, but rather a solution in which there is an interaction between the species.

EXAMPLES

General Procedure

In order to identify those solvent systems stable over an extended lifetime at elevated temperatures ($\geq 85°$ C.), the following general procedure was adopted.

Dried, recrystallised TEATFB was used throughout. Solvents used in this experiment were obtained from Merck Germany with the highest quality available i.e. Selectipur® and were run through a chromatography column packed with about 10 cm of γ alumina. The moisture content in the final product was estimated by Karl Fischer titration as follows: GBL=10 ppm, PC=5 ppm, AN=2 ppm. EC was a solid and was not further purified. Once the salt was added, the mixture was shaken well until all salts were dissolved.

Where ratios of solvents were used, these refer to mole ratios.

Solutions of TEATFB were all 1 molar unless otherwise indicated. Where experiments are conducted on solvent only (eg, AN, or 2AN:0.86 GBL:EC) this is indicated in the text.

The solvent mixtures were prepared with final volumes between 30 to 40 ml which were sufficient for boiling point and conductivity tests.

The conductivity of these electrolytes were measured inside a dry nitrogen atmosphere in a glove box using a handheld ULTRAMETER (Model 6P) from Nyron L Company in accordance with the recommended procedure in the operating manual.

For boiling point determination, the sample vial was filled with about 20 ml of test electrolyte plus some boiling chips and heated rapidly (~10° C./min) until the temperature reached ~75° C., then reduced to a rate rise of about 2° C./min or less, with continued monitoring of the solution.

EC, being a solid at room temperature, was kept in a 50° C. environment to ensure it remained liquid at all times. Where EC was used in conjunction with other solvents in a binary or ternary mixture, the salt was added subsequent to the combining of the solvents.

Unless otherwise stated, a standard test cell of area 28 cm$^2$ was used to generate results. For the standard test cells, two carbon-coated electrodes were cut to a size of 28 cm$^2$ excluding terminals. The electrodes are cut such that they are 8 cm×3.5 cm. The terminals were approximately 4 cm long and were 2.5 cm from the corner along the longest edge. One electrode was folded in half such that the carbon was facing inwards. The second electrode was folded in half such that the carbon was facing outwards. This second electrode was encompassed in a membrane separator and the membrane-encased electrode was slid into the first electrode. Unless stated otherwise a 50 μm polyolefin membrane was used. Those skilled in the art will appreciate that both the materials and the thickness of the membranes can be varied considerably without effecting the overall functionality of the device. The carbon layers were facing each other with a separator in between. The device was assembled so that the terminals were both pointing in the same direction.

A multilayer soft packaging laminate was wrapped around the electrodes allowing the terminals to protrude to the outside of the packet. The packet was heat sealed leaving one end open. The cell was dried using heat and vacuum. The packet was filled with enough electrolyte to cover the electrodes and sealed. The sealed packet was pierced and taken to a tight vacuum. The packet was sealed again close to the electrode stack to complete the standard test cell.

Examples of electrode arrangements may be found in our copending applications PCT/AU01/01613 and PCT/AU01/01590, the contents of which are incorporated herein by reference.

The cell was then cycled between a low voltage and the voltage at which the cell was to be used. Electrical testing was then performed. ESR measurements were taken, at voltage as per the industry standard, which in the present case is 1.8V, at 1 kHz. Capacitance was measured using a discharge current of 0.2 A.

Where the following data is dependent upon the construction of the supercapacitor, such data is given as being either "Series X", which has a nominal 4.5 μm carbon layer; "Series Z" which has a nominal 7.3 μm carbon layer thickness; "Series Y", which has a nominal 10 μm carbon layer thickness; and "Series W" which has a 13.5 μm coating thickness. The density of the series is as follows: Series X-0.22 mg/cm$^3$; Series Y-0.33 mg/cm$^3$; Series W-1.12 mg/cm$^3$ and Series Z 0.35 mg/cm$^3$. Because the series data relate to variations in the construction of the supercapacitor Series X data should only be compared with other Series X data and so on. Control data obtained for acetonitrile in all series enables the relative results to be standardised and compared. The cells which take the form of a multiple layered electrode stacks invariably used a coating thickness of nominally 6 μm and a density of approximately 0.35 mg/cm$^3$ Experimental errors in observed values have not been quoted here, although those skilled in the art will be familiar with the precision and accuracy with which such values are normally determined.

Descriptions of the construction of multilayered electrode stack devices are disclosed in our copending application PCT/AU01/01613, the contents of which are incorporated herein by reference. In the present case, the electrode area was 24.4 cm$^2$.

The standard test cell, for a nominally 6 μm thick coating and nominally 50 μm thick separator membrane, has a volume in the order of 1.23×10$^{-6}$ m$^3$ and a weight of 1.76 g including the multilayer packaging laminate.

The standard test cell, for a nominally 6 μm thick coating and nominally 50 μm thick separator membrane, has a volume in the order of $3.03 \times 10^{-7}$ m$^3$ and a weight of 0.43 g neglecting the multilayer packaging laminate.

The cell comprised of a multiple layered electrode stack, for a nominally 6 µm thick coating and nominally 50 µm thick separator membrane, has a volume in the order of $8.62 \times 10^{-7}$ m$^3$ and a weight of 0.97 g including the multilayer packaging laminate.

The cell comprised of a multiple layered electrode stack, for a nominally 6 µm thick coating and nominally 50 µm thick separator membrane, has a volume in the order of $3.19 \times 10^{-7}$ m$^3$ and a weight of 0.39 g neglecting the multilayer packaging laminate.

The two cell device comprised of two multiple layered electrode stacks connected in series, for a nominally 6 µm thick coating and nominally 50 µm thick separator membrane, has a volume in the order of $1.72 \times 10^{-6}$ m$^3$ and a weight of 1.94 g including the multilayer packaging laminate.

The two cell device comprised of two multiple layered electrode stacks connected in series, for a nominally 6 µm thick coating and nominally 50 µm thick separator membrane, has a volume in the order of $6.37 \times 10^{-6}$ m$^3$ and a weight of 0.78 g neglecting the multilayer packaging laminate.

It will be obvious to those skilled in the art that altering the physical properties, including the density of the coating, the thickness of the coating, the density of the separator, the thickness of the separator and or the density of the multilayer soft packaging laminate or the thickness of the multilayer soft packaging laminate or the thickness or density of the current collector will alter the volume and thickness of the cells similarly.

1. Mono Solvent Systems

As mentioned earlier, acetonitrile is an extremely useful electrolyte solvent. It has a very low viscosity and a very high dielectric constant. Both these attributes combine to make an acetonitrile electrolyte which has a very high conductivity. The downside of using acetonitrile as the electrolyte in a supercapacitor is the fact that it boils at around 80° C. which means that there are additional containment problems to address if the supercapacitor is to be used at high temperatures.

In order to identify an alternate solvent with a comparable conductivity, the parameters for likely mono solvent systems were established before focussing on binary and ternary solvent systems. Three different solvents were mixed with tetraethylammonium tetrafluoroborate up to saturation or 1M, which ever is the lesser. These mixtures were then purified in the usual method and tested in a variety of methods including electrical testing, in standard test cells, as well as conductivity measurements over a range of temperatures.

Results

Three main electrolyte solvents were tested: γ-butyrolactone (GBL), propylene carbonate (PC) and ethylene carbonate (EC). Acetonitrile was also used as a control.

The relevant physical properties of the solvents in question are as follows:

| Solvent | Melting Point/Boiling Point (° C.) | Dielectric Constant | Density (g/cm$^3$) at 20° C. | Viscosity (cP) at 25° C. |
|---|---|---|---|---|
| Acetonitrile (AN) | −46/82 | 38 (at 20° C.) | 0.78 | 0.369 |
| γ-butyrolactone (GBL) | −44/204-6 | 39 (at 25° C.) | 1.13 | 1.17 |
| Propylene Carbonate (PC) | −48/242 | 65 (at 25° C.) | 1.21 | 2.8 (20° C.) |
| Ethylene Carbonate (EC) | 35-8/247-9 | 95 (at 25° C.) | 1.41 | 1.92 (40° C.) |

Acetonitrile (AN):

| Acetonitrile | Temperature (deg C.) | Conductivity (mS/cm) |
|---|---|---|
| 1M TEATFB | −20 | 32.8 |
| | 0 | 48.1 |
| | 25 | 59.6 |
| | 50 | 70.2 |
| | 75 | 79.7 |

Figure 4:
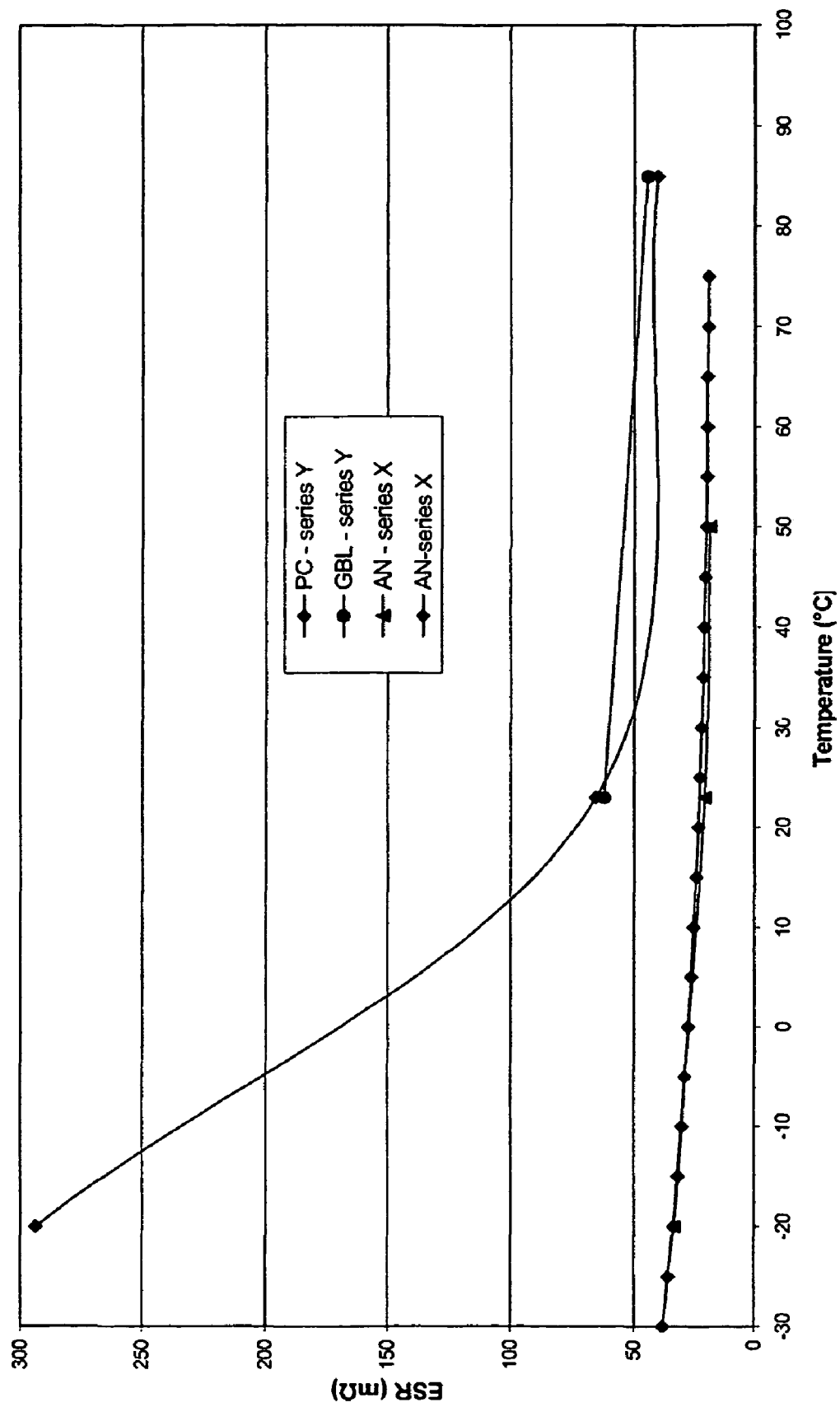
FIG. 4 shows a graph of ESR against temperature for mono solvent systems for Series Y and Series X standard test cells.
Figure 5:
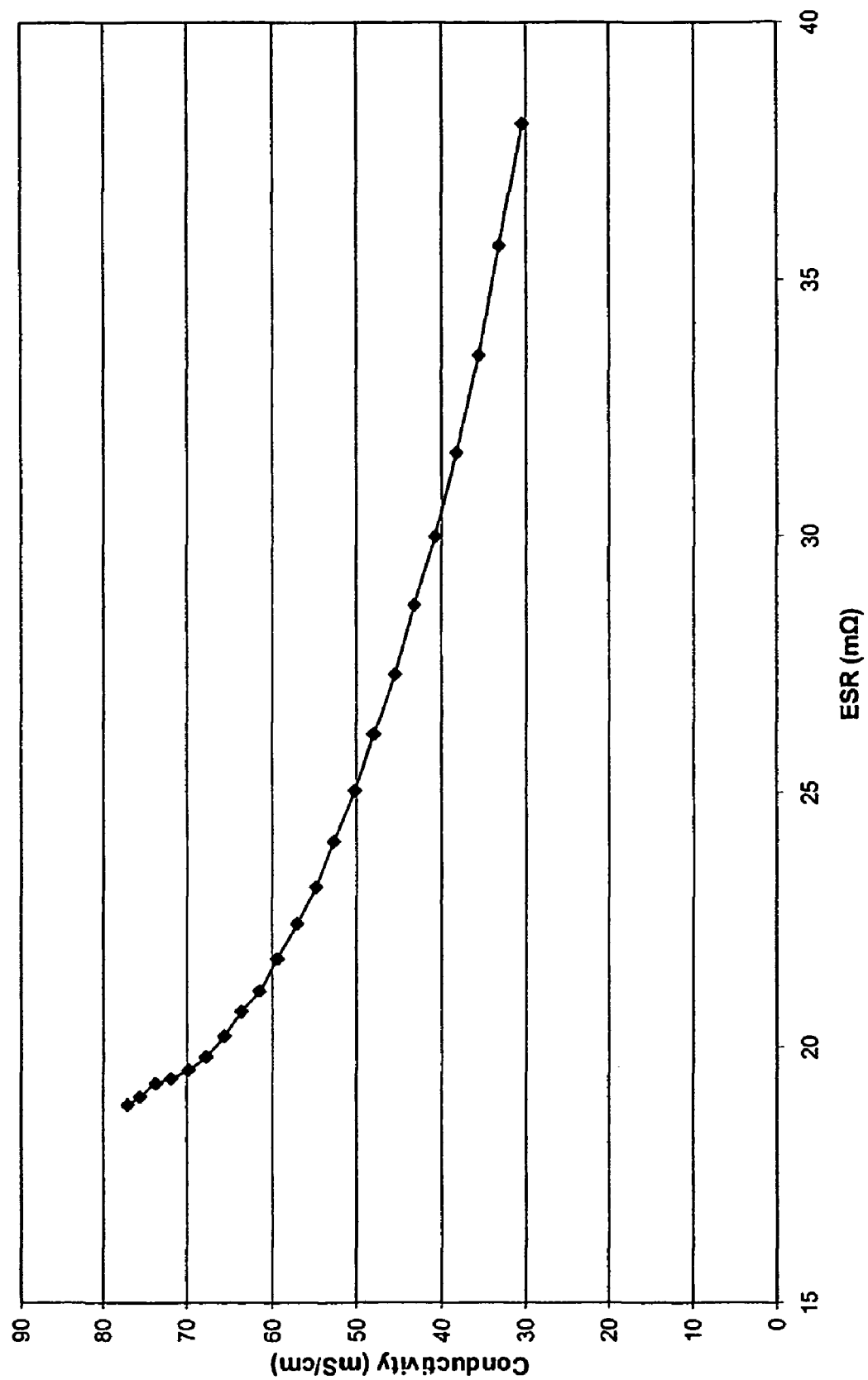
FIG. 5 shows the relationship between conductivity and ESR for a Series X standard test cell with acetonitrile.
Figure 6:
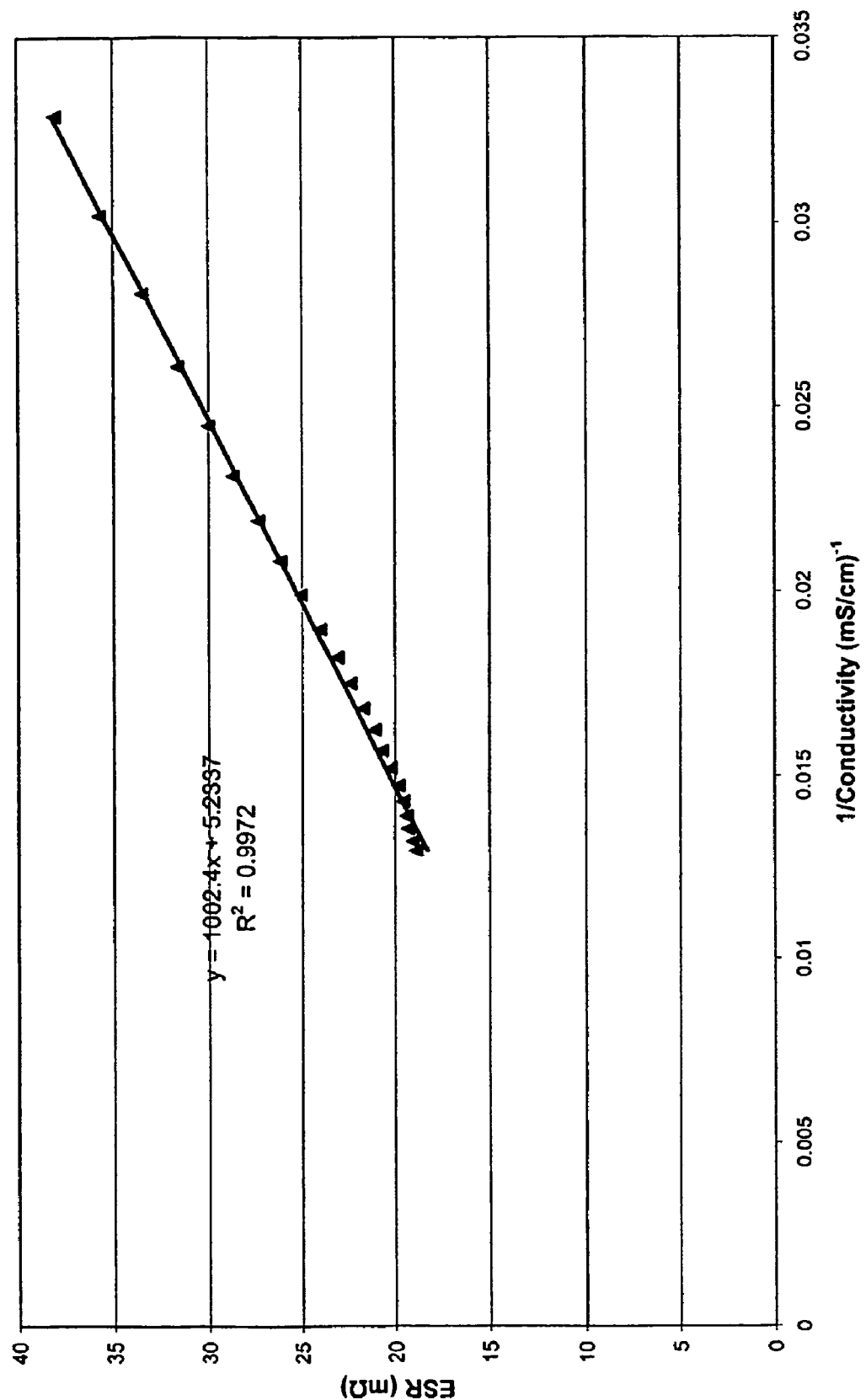
FIG. 6 shows a graph of ESR vs 1/conductivity (obtained by varying the temperature) for a Series X standard test cell with acetonitrile.

As mentioned in the introduction, conductivity, viscosity, temperature and ESR are related. FIG. 4 shows ESR versus Temperature for PC, GBL and AN. In order to illustrate the principle further, FIGS. 5 and 6 show plots of ESR against conductivity and ESR against 1/conductivity respectively for AN.

The following data was obtained in a standard test cell:

Series Y

| Electrolyte | | ESR (mΩ)23° C. | Capacitance (0.2 A) (F) 23° C. |
|---|---|---|---|
| AN | 1M TEATFB | 25.1 | 0.72 |

Series X

| Electrolyte | | ESR (mΩ)23° C. | Capacitance (0.2 A) (F) 23° C. |
|---|---|---|---|
| AN | 1M TEATFB | 20.5 | 0.52 |

γ-Butyrolactone (GBL): The saturation point for this liquid, with respect to tetraethylammonium tetrafluoroborate, is around 0.92M at room temperature (23° C.). The conductivity measurements over a range of temperatures is shown in the following table:

| γ-Butyrolactone | Temperature (Deg C.) | Conductivity (mS/cm) |
|---|---|---|
| 0.92M | −5.6 | 9.0 |
| | 0.1 | 10.5 |
| | 23.6 | 16.9 |

-continued

| γ-Butyrolactone | Temperature (Deg C.) | Conductivity (mS/cm) |
|---|---|---|
| | 85.2 | 33.2 |
| | 131.0 | 51.0 |

It can be seen from this table that the conductivity of the solution does not rival the room temperature conductivity of 1M acetonitrile (55 mS/cm) until over 130° C. This is most likely due to the increased viscosity of the GBL as compared to AN. The test cells at room temperature (below) also show a proportionally higher ESR than the control.

Series Y

| Electrolyte | | ESR (mΩ) 23° C. | Capacitance (0.2 A) (F) 23° C. |
|---|---|---|---|
| AN | 1M TEATFB | 25.1 | 0.72 |
| GBL | 0.92M TEATFB | 62.1 | 0.70 |

Propylene Carbonate (PC): Propylene carbonate can solvate slightly more than one molar of tetraethylammonium tetrafluoroborate. The saturation limit is around 1.2M at room temperature. The conductivity data was found to be as follows:

| PC 1M | Temperature (Deg C.) | Conductivity (mS/cm) |
|---|---|---|
| | −22.5 | 1.3 |
| | 0 | 8.0 |
| | 25 | 13.8 |
| | 85 | 30.2 |
| | 180 | 55.1 |

Like GBL, propylene carbonate does not have a conductivity anywhere near the room temperature conductivity of AN until it reaches 180° C. The averages for the ESR of the test cells were found to be:

Series Y

| Electrolyte | | ESR (mΩ) 23° C. | Capacitance (0.2 A) 23° C. |
|---|---|---|---|
| AN | 1M TEATFB | 25.1 | 0.72 |
| PC | 1M TEATFB | 65.4 | |

Interestingly the dielectric constant of propylene carbonate is higher than acetonitrile (almost double in fact) which should allow it to dissociate more salt. While such a characteristic is desirable the main drawback with using propylene carbonate, which corresponds to the higher ESR, is its exorbitantly high viscosity: PC is over 7 times more viscous than AN. The main benefit with PC is its 242° C. boiling point.

Ethylene Carbonate (EC) is slightly different from the other solvent systems used in that it is a solid at ambient temperatures. Consequently, it was not possible to obtain data for EC alone at temperatures below about 35-40° C.

The ESR of Series X and Series Y cells is given in the following table and a plot of ESR against temperature is shown in FIG. 4.

| | ESR at specified temp (mΩ) | | | |
|---|---|---|---|---|
| | −20° C. | 23° C. | 50° C. | 85° C. |
| 1M TEATFB in AN | 33.5 | 20.5 | 18.5 | |
| 1M TEATFB in PC | 293.9 | 65.4 | | 40.0 |
| 0.92M TEATFB in GBL | | 62.1 | | 44.1 |
| EC | Solid | Solid | | |

2. Binary Solvent System

Following a thorough analysis of the boiling points and conductivities of various combinations of acetonitrile (AN), ethylene carbonate (EC), γ-butyrolactone (GBL), and propylene carbonate (PC), binary mixtures of each were prepared to investigate their suitability for high temperature application.

The main binary systems investigated were those with a combination of a low boiling, non viscous liquid, and a higher boiling more viscous liquid. In particular, these were: AN:GBL, AN:0.86 GBL, AN:PC, and AN:EC The electrolytes were made up as 1M (tetraethylammonium tetrafluoroborate) TEATFB solutions and underwent electrical performance and stability testing across a range of −20° C. to 95° C.

Control data for AN is given and those skilled in the art will readily appreciate that this value can be used to standardize the data between Series X, Series Y and Series Z and allow a direct comparison of the quantitative differences between the two data sets, should this be desired.

| Solution | Conductivity (mS/cm) | Tested temp (° C.) | Boiling Point (° C.) |
|---|---|---|---|
| 0.86GBL:AN | 31.3 | 29.0 | 108-110 |
| GBL:AN | 30.6 | 23.8 | 106 |
| 0.86GBL:2AN | 38.1 | 26.4 | 97 |
| GBL:2AN | 36.9 | 23.0 | 97 |
| 1.72GBL:AN | 25.9 | 26.9 | 125-126 |
| 2GBL:AN | 24.8 | 23.0 | 121 |
| PC:AN | 27.0 | 26.2 | 112 |
| PC:2AN | 26.7 | 26.4 | 112 |
| 2PC:AN | 21.3 | 27.3 | 131-132 |
| PC:2.5AN | 36.0 | 28.9 | 96 |
| PC:3AN | 37.7 | 29.4 | 92 |
| EC:AN | 28.5 | 26.2 | 110-113 |
| EC:2AN | 43.3 | 26.2 | 93 |
| 2EC:AN | 28.5 | 27.1 | 113 |
| EC:1.5AN | 32.0 | 30.5 | 104 |

The ESR and Capacitance of supercapacitors incorporating the solvent systems of the present invention were investigated at 23° C. The control data and results are summarised below and are plotted on the phase diagrams and in FIG. 5.

Series X (Control)

| Electrolyte | | ESR (mΩ) 23° C. | Capacitance (0.2 A) (F) 23° C. |
|---|---|---|---|
| AN | 1M TEATFB | 20.5 | 0.52 |

Series Y (Control)

| Electrolyte | | ESR (mΩ) 23° C. | Capacitance (0.2 A) (F) 23° C. |
|---|---|---|---|
| AN | 1M TEATFB | 25.1 | 0.72 |

Series Z (Control)

| Electrolyte | | ESR (mΩ) 23° C. | Capacitance (0.2 A) (F) 23° C. |
|---|---|---|---|
| AN | 1M TEATFB | 19.4 | 0.74 |

Series X

| Electrolyte | | ESR (mΩ) | Capacitance (F) |
|---|---|---|---|
| AN:0.86GBL | 1M TEATFB | 26.8 | 0.40 |

Series Z

| Electrolyte | | ESR (mΩ) | Capacitance (F) |
|---|---|---|---|
| AN:GBL | 1M TEATFB: | 31.9 | 0.75 |

Series Z

| Electrolyte | | ESR (mΩ) | Capacitance (F) |
|---|---|---|---|
| AN:0.86GBL | 1M TEATFB | 27.5 | 0.75 |

Series X

| Electrolyte | | ESR (mΩ) | Capacitance (F) |
|---|---|---|---|
| AN:EC | 1M TEATFB | 35.9 | 0.38 |

Series X

| Electrolyte | | ESR (mΩ) | Capacitance (F) |
|---|---|---|---|
| AN:PC | 1M TEATFB | 38.3 | 0.32 |

Series Y

| Electrolyte | | ESR (mΩ) | Capacitance (F) |
|---|---|---|---|
| AN:PC | 1M TEATFB | 41.6 | 0.48 |

The results for the mixtures were plotted on phase diagrams, as shown in FIGS. 15 to 26.

The ESR of various binary mixtures was measured at a range of temperatures, and the results are shown in the following table.

1M TEATFB

| Data Series | Electrolytes: | ESR at specified temp (mΩ) | | |
|---|---|---|---|---|
| | | −20° C. | 23° C. | 85° C. |
| Series X | AN:0.86GBL | 70.7 | 26.8 | 23.4 |
| Series Z | AN:0.86GBL | | 27.5 | |
| Series Z | AN:GBL | 65.1 | 31.7 | 21.7 |
| Series X | AN:EC | 230.3 | 35.9 | 28.3 |
| Series X | AN:PC | | 38.3 | |
| Series Y | AN:PC | | 41.6 | 27.3 |

The conductivity of AN:0.86GBL and AN:GBL solutions with 1M TEATFB was determined for a range of temperatures. The results are shown in the following table.

| AN:0.86GBL | Temperature (° C.) | Conductivity (mS/cm) |
|---|---|---|
| 1M TEATFB | −30 | 13.4 |
| | −20 | 17.0 |
| | 0 | 24.3 |
| | 23 | 31.8 |
| | 50 | 42.4 |
| | 85 | 55.2 |

| AN:GBL | Temperature (° C.) | Conductivity (mS/cm) |
|---|---|---|
| 1M TEATFB | −30 | 10.9 |
| | −20 | 13.3 |
| | 0 | 19.8 |
| | 23 | 30.6 |
| | 50 | 39.4 |
| | 85 | 52.5 |

Ternary Solvent Systems

A number of ternary solvent mixtures were prepared. The selection of the most likely solvent mixtures and ratios was in part based upon the results obtained from plotting the binary mixtures around the outer periphery of the triangular phase diagrams shown in the Figures.

The conductivity and boiling point of the electrolytes prepared are shown in the following table:

| Solvent system (1M TEATFB) | Conductivity (mS/cm) | Tested temp (° C.) | Boiling Point (° C.) |
|---|---|---|---|
| PC:AN:0.86GBL | 23.2 | 30.8 | 132 |
| PC:AN:GBL | 23.0 | 23.0 | 122-124 |
| PC:2AN:0.86GBL | 29.0 | 28.0 | 101-105 |
| PC:2AN:GBL | 28.3 | 24.2 | 106-108 |
| 3AN:0.86GBL:PC | 32.4 | 31.0 | 104 |
| 3AN:GBL:PC | 32.6 | 23.0 | 98 |
| 3AN:1.72GBL:PC | 28.7 | 29.9 | 109 |
| 3AN:2GBL:PC | 28.1 | 23.9 | 109 |
| 6AN:0.86GBL:2PC | 35.1 | 28.9 | 98 |
| 6AN:GBL:2PC | 34.3 | 23.0 | 96 |
| EC:2AN:0.86GBL | 30.5 | 27.7 | 108-113 |
| EC:2AN:GBL | 31.4 | 23.8 | 108 |
| 0.86GBL:EC:AN | 25.6 | 29.9 | 130 |
| GBL:EC:AN | 26.4 | 23.0 | 118-120 |
| 3AN:1.72GBL:EC | 30.5 | 32.1 | 109 |

-continued

| Solvent system (1M TEATFB) | Conductivity (mS/cm) | Tested temp (° C.) | Boiling Point (° C.) |
|---|---|---|---|
| 3AN:2GBL:EC | 30.9 | 23.7 | 107-110 |
| 3AN:0.86GBL:2EC | 30.0 | 32.3 | 108-110 |
| 3AN:GBL:2EC | 31.6 | 23.2 | 107 |
| EC:AN:PC | 22.4 | 27.8 | 106-107 |
| PC:EC:2AN | 28.3 | 29.3 | 108-110 |
| 3AN:EC:PC | 31.7 | 28.7 | 101-104 |
| 4.5AN:2EC:PC | 32.0 | 28.7 | *104 |
| 6AN:2PC:EC | 34.4 | 29.0 | *100 |

Those entries in the table above marked with an asterisk exhibited some apparent fractionation before reaching the stated boiling point. Without wishing to be bound by theory, it is believed this was as a result of excess acetonitrile in those mixtures over and above that required to provide the true high boiling ternary mixture.

Boiling point elevation was also seen when AN was blended with different mole ratios of PC, EC and GBL. Without wishing to be bound by theory, these observations lead to the hypothesis that the AN may form complexes with the other solvent molecules in the solution which resulted in the elevation of acetonitrile boiling temperature. It was also noticed that the boiling temperature increased as the conductivity (at any given temperature) of the solution decreased.

From the results above, some promising systems were chosen for ESR and capacitance testing because they appear to have the temperature range and conductivities to meet ESR requirements across the temperature range from −30° C. to 95° C.

The following results were obtained with standard test cells.

Series X:

| Solvent System | | 23° C. | |
|---|---|---|---|
| | | ESR (mΩ) | Capacitance (F) |
| 3AN:1.72GBL:PC | 1M TEATFB | 31.7 | 0.44 |
| 3AN:0.86GBL:2EC | 1M TEATFB | 30.3 | 0.46 |
| 2AN:PC:EC | 1M TEATFB | 34.5 | 0.42 |
| 2AN:0.86GBL:PC | 1M TEATFB | 34.0 | 0.41 |
| 2AN:0.86GBL:EC | 1M TEATFB | 31.5 | 0.43 |
| 3AN:1.72GBL:EC | 1M TEATFB | 30.5 | 0.42 |

Series Z:

| Solvent System | | 23° C. | |
|---|---|---|---|
| | | ESR (mΩ) | Capacitance (F) |
| 3AN:2GBL:PC | 1M TEATFB | 33.8 | 0.71 |
| 3AN:GBL:2EC | 1M TEATFB | 31.6 | 0.70 |
| 2AN:GBL:PC | 1M TEATFB | 34.9 | 0.70 |
| 2AN:GBL:EC | 1M TEATFB | 31.6 | 0.72 |
| 3AN:2GBL:EC | 1M TEATFB | 26.7 | 0.72 |

A number of trials were also conducted using Series Y standard test cells. Series X and Series Y results are compared in the following table. All averages are based on 2-5 cells.

ESR and Capacitance 23° C.

| Electrolyte: | ESR (mΩ) Series Y | Capacitance (F) Series Y | ESR (mΩ) Series X | Capacitance (F) Series X |
|---|---|---|---|---|
| 2AN:0.86GBL:EC Average | 41.4 | 0.8 | 31.5 | 0.48 |
| AN:PC:0.86GBL Average: | 48.5 | 0.78 | | |

Series W and Series Z results for standard test cells are compared in the following table. Averages are based on results from 5 cells.

ESR and Capacitance 23° C.

| Electrolyte: | ESR (mΩ) Series W | Capacitance (F) Series W | ESR (mΩ) Series Z | Capacitance (F) Series Z |
|---|---|---|---|---|
| 2AN:GBL:EC | 30.0 | 1.13 | 31.6 | 0.72 |
| AN:PC:GBL | 39.1 | 1.32 | 32.8 | 0.70 |

The ESR of the ternary mixtures were measured at varying temperatures. The results are the average of 3-5 standard test cells in Series X and Series Z and are shown in the tables below and in FIG. 8.

Series X:

| | ESR at specified temp (mΩ) | | | | |
|---|---|---|---|---|---|
| Solvent System | −30° C. | −20° C. | 23° C. | 50° C. | 85° C. |
| 2AN:0.86GBL:EC | 135.0 | 74.5 | 31.5 | 27.1 | 26.3 |
| 2AN:0.86GBL:PC | 187.9 | 77.9 | 34.0 | 26.4 | 25.3 |
| 2AN:PC:EC | 149.2 | 90.9 | 34.5 | 29.8 | 28.5 |
| 3AN:1.72GBL:EC | 130.6 | 70.6 | 30.5 | 26.0 | 25.5 |
| 3AN:0.86GBL:2EC | 280.1 | 73.8 | 30.3 | 26.4 | 24.6 |
| 3AN:1.72GBL:PC | 170.4 | 73.1 | 31.7 | 26.9 | 24.6 |

Series Z:

| | ESR at specified temp (mΩ) | | | | |
|---|---|---|---|---|---|
| Solvent System | −30° C. | −20° C. | 23° C. | 50° C. | 85° C. |
| 2AN:GBL:EC | 85.64 | 74.05 | 35.05 | 32.83 | 23.3 |
| 2AN:GBL:PC | 89.79 | 59.02 | 34.79 | 33.59 | 22.3 |
| 3AN:2GBL:EC | 64.3 | 53.8 | 26.7 | 22.5 | 20.9 |
| 3AN:GBL:2EC | 83.80 | 70.10 | 31.57 | 29.72 | 23.1 |
| 3AN:2GBL:PC | 96.46 | 73.15 | 32.71 | 31.66 | 22.28 |

The ESR of the ternary mixtures at varying temperatures for Series X and Series Z were adjusted for geometric area and a value of ESR multiplied by square cm of current collector (ESRx28 cm²)at different temperatures was obtained and is shown below in the table.

Series X:

| Boiling Point (° C.) | Solvent System | ESR × Area at specified temp (mΩ cm²) | | | | |
|---|---|---|---|---|---|---|
| | | −30° C. | −20° C. | 23° C. | 50° C. | 85° C. |
| 108-113 | 2AN:0.86GBL:EC | 3763 | 2117 | 862 | 784 | 706 |
| 101-105 | 2AN:0.86GBL:PC | 5253 | 2195 | 941 | 706 | 706 |
| 108-110 | 2AN:PC:EC | 4155 | 2509 | 941 | 862 | 784 |
| 109 | 3AN:1.72GBL:EC | 3684 | 1960 | 862 | 706 | 706 |
| 108-110 | 3AN:0.86GBL:2EC | 7840 | 2038 | 862 | 706 | 706 |
| 109 | 3AN:1.72GBL:PC | 4782 | 2038 | 862 | 784 | 706 |

Series Z:

| Boiling Point (° C.) | Solvent System | ESR × Area at specified temp (mΩ cm²) | | | | |
|---|---|---|---|---|---|---|
| | | −30° C. | −20° C. | 23° C. | 50° C. | 85° C. |
| 108 | 2AN:GBL:EC | 2489.2 | 2113.4 | 1012.6 | 907.2 | 637.1 |
| 107-110 | 3AN:2GBL:EC | 1800.4 | 1506.4 | 747.6 | 630 | 585.2 |
| 107 | 3AN:GBL:2EC | 2230.8 | 1876.7 | 901.7 | 821.1 | 606.8 |
| 109 | 3AN:2GBL:PC | 2812.5 | 2097.9 | 945.4 | 880.0 | 619.3 |

The ESR of the ternary mixture was compared with the ESR of acetonitrile at a range of temperatures. In this way, the relative performance of the mixtures can be evaluated in a manner independent of device construction. The table below shows the ratio of the ESR of a ternary electrolyte device to the ESR of a corresponding acetonitrile electrolyte device, where both devices are at the temperature specified in the table. The ratio for embodiments using a binary electrolyte is also given. For reference, the absolute value of the ESR of the AN control device was 38.0 mΩ at −30° C., 33.5 mΩ at −20° C., 20.5 mΩ at 23° C. and 18.5 mΩ at 50° C. for series X. For the series Z device, the absolute value of the ESR of the AN control device was 35.2 mΩ at −30° C., 31.2 mΩ at −20° C., 19.4 mΩ at 23° C. and 16.4 mΩ at 50° C.

Series X:

| Boiling Point (° C.) | Solvent System | ESR of ternary/ESR of AN | | | |
|---|---|---|---|---|---|
| | | −30° C. | −20° C. | 23° C. | 50° C. |
| 108-113 | 2AN:0.86GBL:EC | 3.5 | 2.2 | 1.5 | 1.5 |
| 101-105 | 2AN:0.86GBL:PC | 4.9 | 2.3 | 1.7 | 1.4 |
| 108-110 | 2AN:PC:EC | 3.9 | 2.7 | 1.7 | 1.6 |
| 109 | 3AN:1.72GBL:EC | 3.4 | 2.1 | 1.5 | 1.4 |
| 108-110 | 3AN:0.86GBL:2EC | 7.4 | 2.2 | 1.5 | 1.4 |
| 109 | 3AN:1.72GBL:PC | 4.5 | 2.2 | 1.5 | 1.5 |
| 108-110 | AN:0.86GBL | | 2.1 | 1.2 | |

Series Z:

| Boiling Point (° C.) | Solvent System | ESR of ternary/ESR of AN | | | |
|---|---|---|---|---|---|
| | | −30° C. | −20° C. | 23° C. | 50° C. |
| 108 | 2AN:GBL:EC | 2.4 | 2.4 | 1.8 | 2.0 |
| 106-108 | 2AN:GBL:PC | 2.8 | 2.5 | 1.8 | 2.0 |
| 107-110 | 3AN:2GBL:EC | 2.0 | 2.2 | 1.6 | 1.7 |
| 107 | 3AN:GBL:2EC | 2.2 | 2.1 | 1.6 | 1.7 |
| 109 | 3AN:2GBL:PC | 2.8 | 2.4 | 1.7 | 1.8 |
| 106 | AN:GBL | 2.4 | 2.1 | 1.6 | 1.8 |

It is not possible to compare the ESR of ternary electrolytes against AN at temperatures much in excess of the boiling point of AN. However, in order to be able to compare the relative performances of all the ternary electrolytes (and the AN:0.86GBL, and AN:GBL binary mixtures) at elevated temperatures, they have been compared in the following tables against the ESR of AN at room temperature for series X (where the absolute value of the ESR of the AN control device at room temperature was 20.5 mΩ) and series Z (where the absolute value of the ESR of the AN control device at room temperature was 19.4 mΩ).

Series X:

| Boiling Point (° C.) | Solvent System | ESR of ternary/ESR of AN @ room temp | | | | |
|---|---|---|---|---|---|---|
| | | −30° C. | −20° C. | 23° C. | 50° C. | 85° C. |
| 108-113 | 2AN:0.86GBL:EC | 6.6 | 3.6 | 1.5 | 1.3 | 1.3 |
| 101-105 | 2AN:0.86GBL:PC | 9.2 | 3.8 | 1.7 | 1.3 | 1.2 |
| 108-110 | 2AN:PC:EC | 7.3 | 4.4 | 1.7 | 1.5 | 1.4 |
| 109 | 3AN:1.72GBL:EC | 6.4 | 3.4 | 1.5 | 1.3 | 1.2 |
| 108-110 | 3AN:0.86GBL:2EC | 13.7 | 3.6 | 1.5 | 1.3 | 1.2 |
| 109 | 3AN:1.72GBL:PC | 8.3 | 3.6 | 1.5 | 1.3 | 1.2 |
| 108-110 | AN:0.86GBL | | 3.4 | 1.2 | | 1.1 |

Series Z:

| Boiling Point (° C.) | Solvent System | ESR of ternary/ESR of AN @ room temp | | | | |
|---|---|---|---|---|---|---|
| | | −30° C. | −20° C. | 23° C. | 50° C. | 85° C. |
| 106-108 | 2AN:GBL:PC | 5.1 | 4.0 | 1.8 | 1.6 | 1.2 |
| 106-108 | 2AN:GBL:PC | 5.1 | 4.0 | 1.8 | 1.6 | 1.2 |
| 107-110 | 3AN:2GBL:EC | 3.5 | 3.5 | 1.6 | 1.5 | 1.1 |
| 107 | 3AN:GBL:2EC | 4.0 | 3.4 | 1.6 | 1.5 | 1.1 |
| 109 | 3AN:2GBL:PC | 5.0 | 3.7 | 1.7 | 1.6 | 1.1 |
| 106 | AN:GBL | 4.3 | 3.2 | 1.6 | 1.5 | 1.2 |

Trials of the 3AN:1.72GBL:EC and 3AN:2GBL:EC ternary mix electrolytes demonstrated desirable ESR's across all temperature ranges. Most importantly, these cells appear to be quite stable at temperatures above 85° C.

Figure 8:
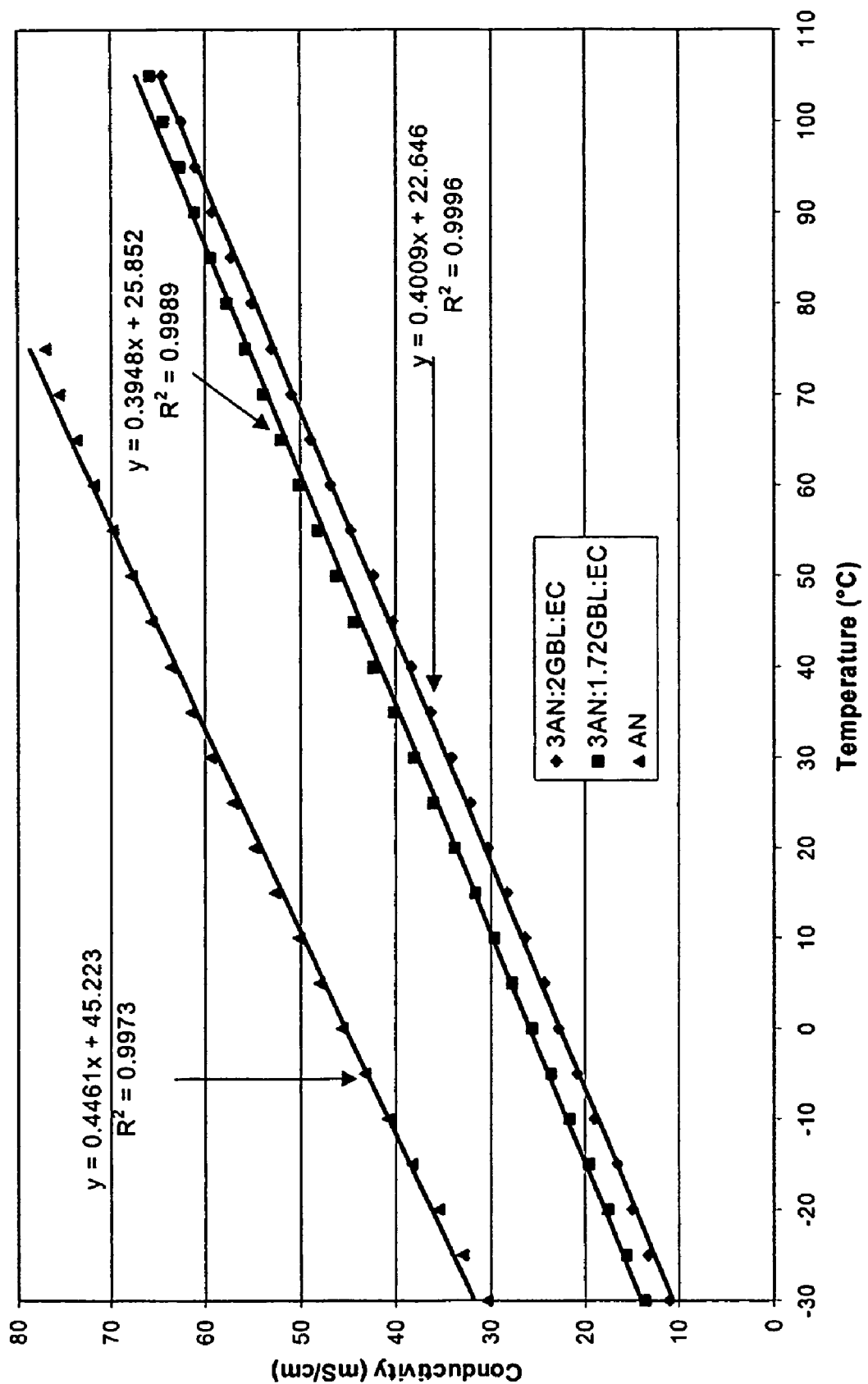
FIG. 8 shows lines of best fit for conductivity against temperature for three electrolyte systems, namely 1M TEATFB in 3AN:1.72GBL:EC, 3AN:2GBL:EC and AN.

The relationship between conductivity and temperature for AN and 3AN:1.72GBL:EC and 3AN:2GBL:EC is shown in FIG. 8. The continuing relationship between conductivity and ESR can be seen to continue smoothly to temperatures in excess of 100° C.

FIG. 8 demonstrates the suitability of the solvent for use at temperatures in excess of those attainable for acetonitrile, as well as illustrating the low ESR values which are attained using the ternary mixtures of the present invention. It is notable that the solvent mixtures of the present invention provide ESR's at high temperature that are similar to the ESR's which can be obtained from AN at room temperature.

Figure 9:
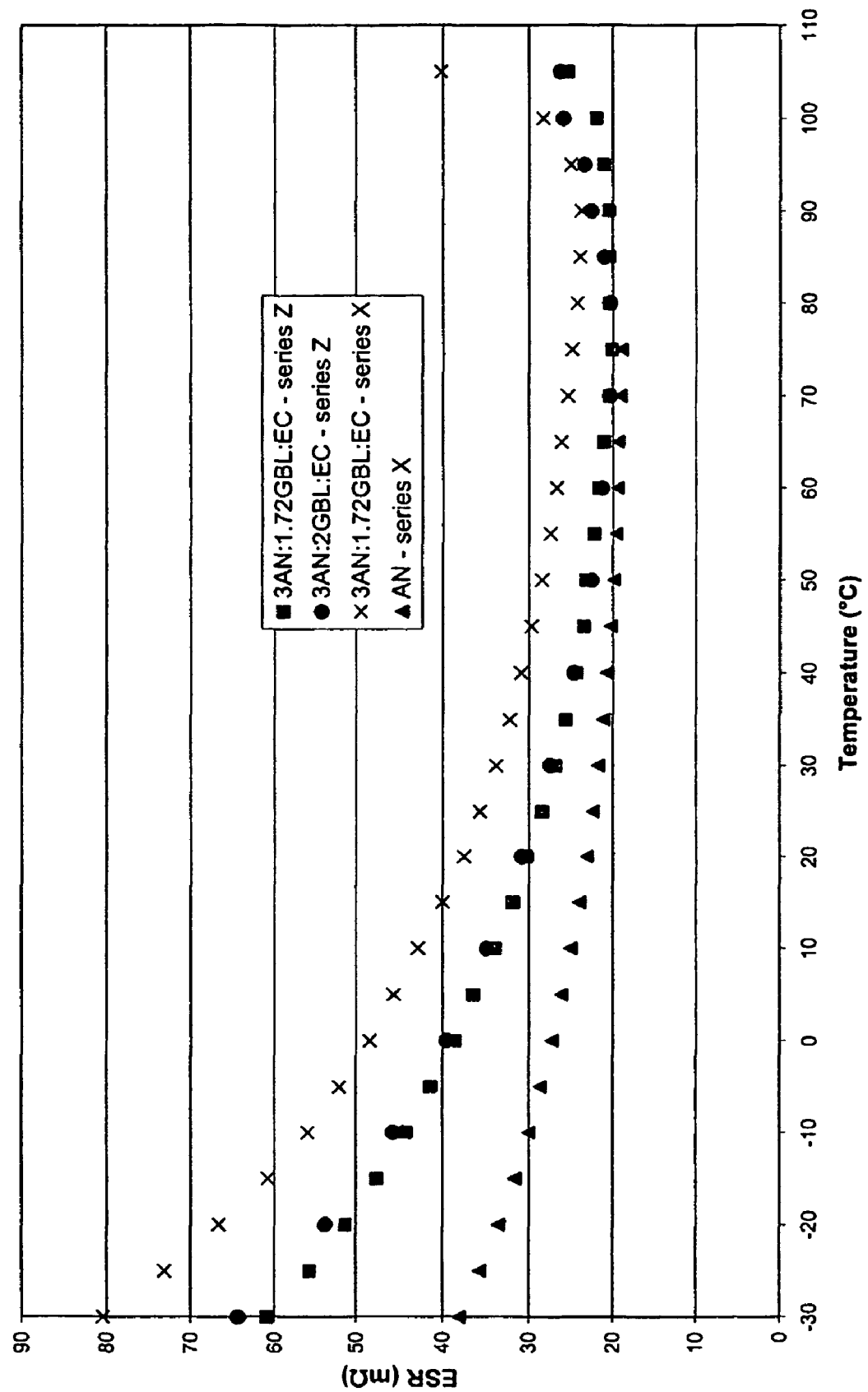
FIG. 9 shows ESR against temperature for standard test cells with 1M TEATFB in 3AN:1.72GBL:EC (Series X and Z), 3AN:2GBL:EC (Series Z) and AN (Series X). The separator is nominally 50 μm thick.
Figure 10:
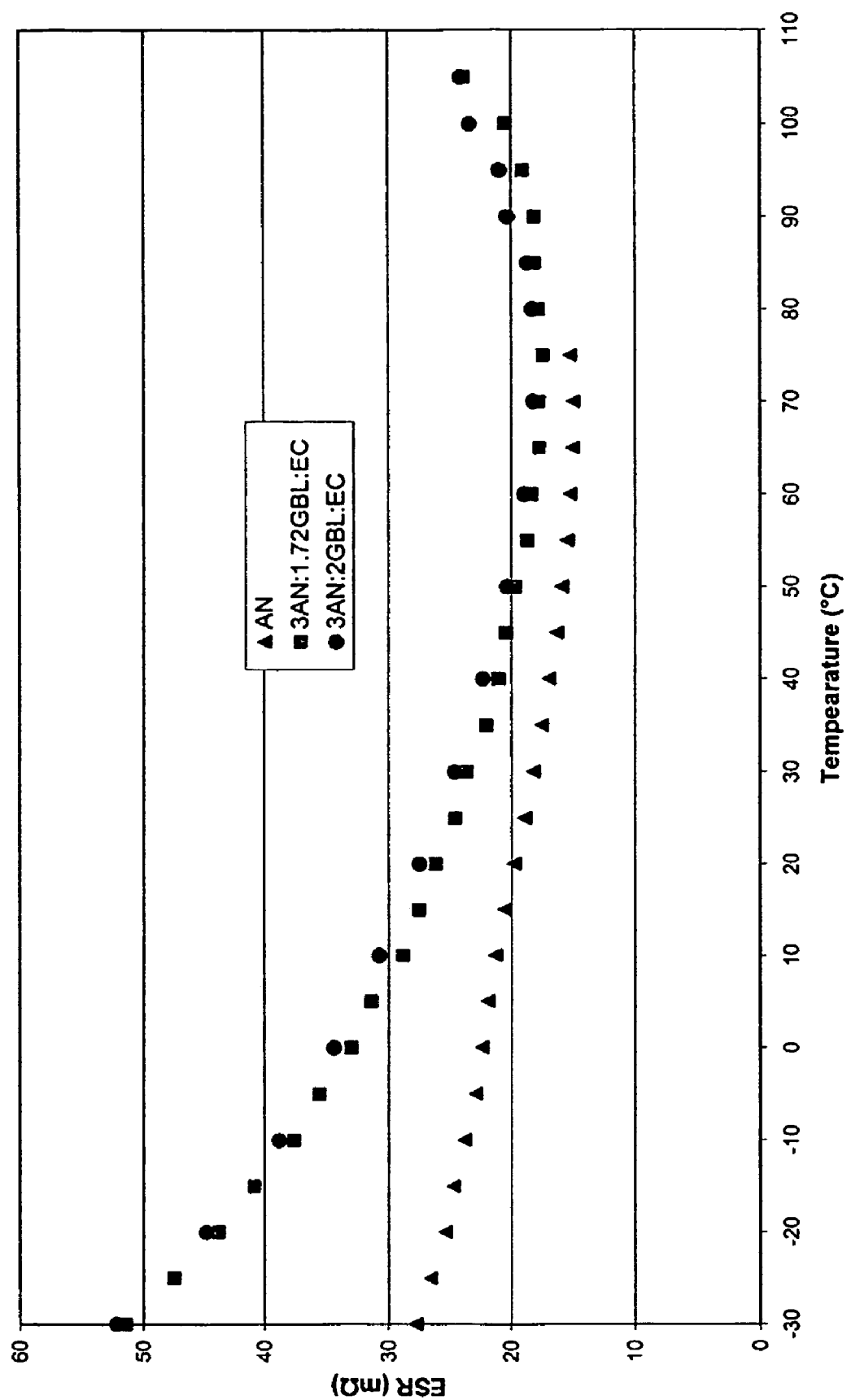
FIG. 10 shows ESR against temperature for Series Z standard test cells having 1M TEATFB in 3AN:2GBL:EC and AN electrolytes. The separator is nominally 20 μm thick.
Figure 11:
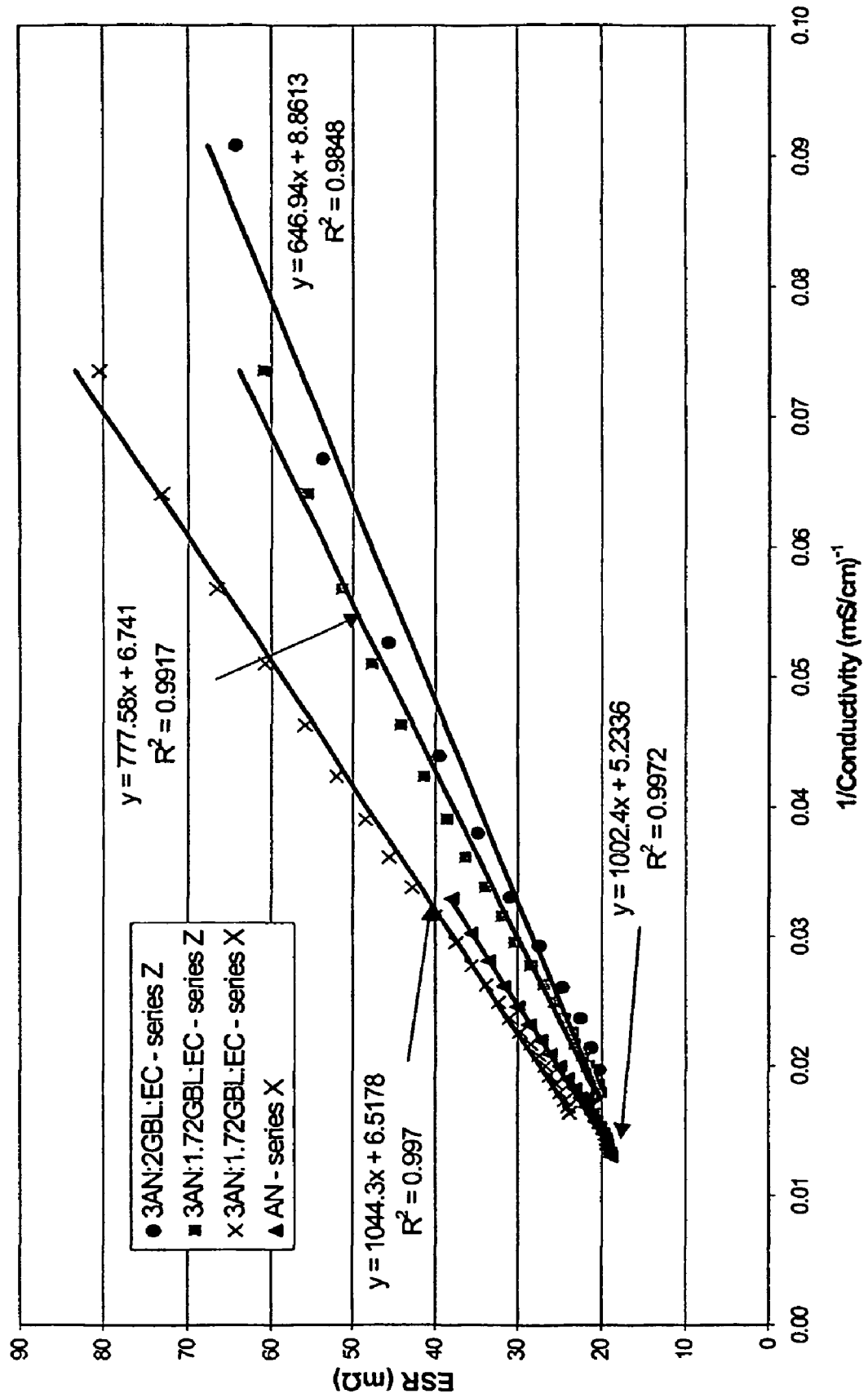
FIG. 11 shows ESR against 1/conductivity for standard test cells with 1M TEATFB in 3AN:1.72GBL:EC (Series X and Z), 3AN:2GBL:EC (Series Z) and AN (Series X). The separator is nominally 50 μm thick.
Figure 12:
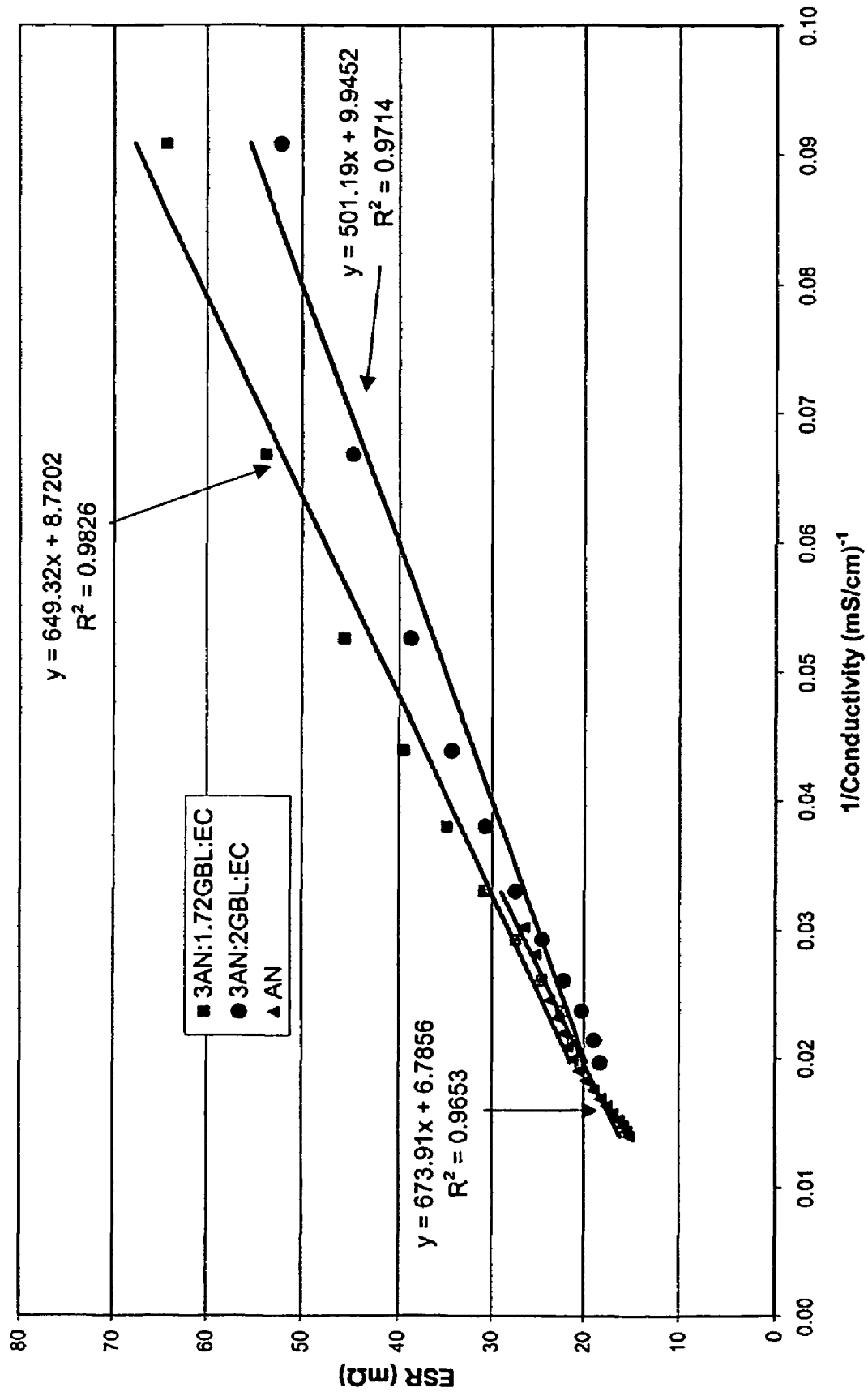
FIG. 12 shows ESR against 1/conductivity for Series Z standard test cells having 1M TEATFB in 3AN:2GBL:EC and AN electrolytes. The separator is nominally 20 μm thick.
Figure 13:
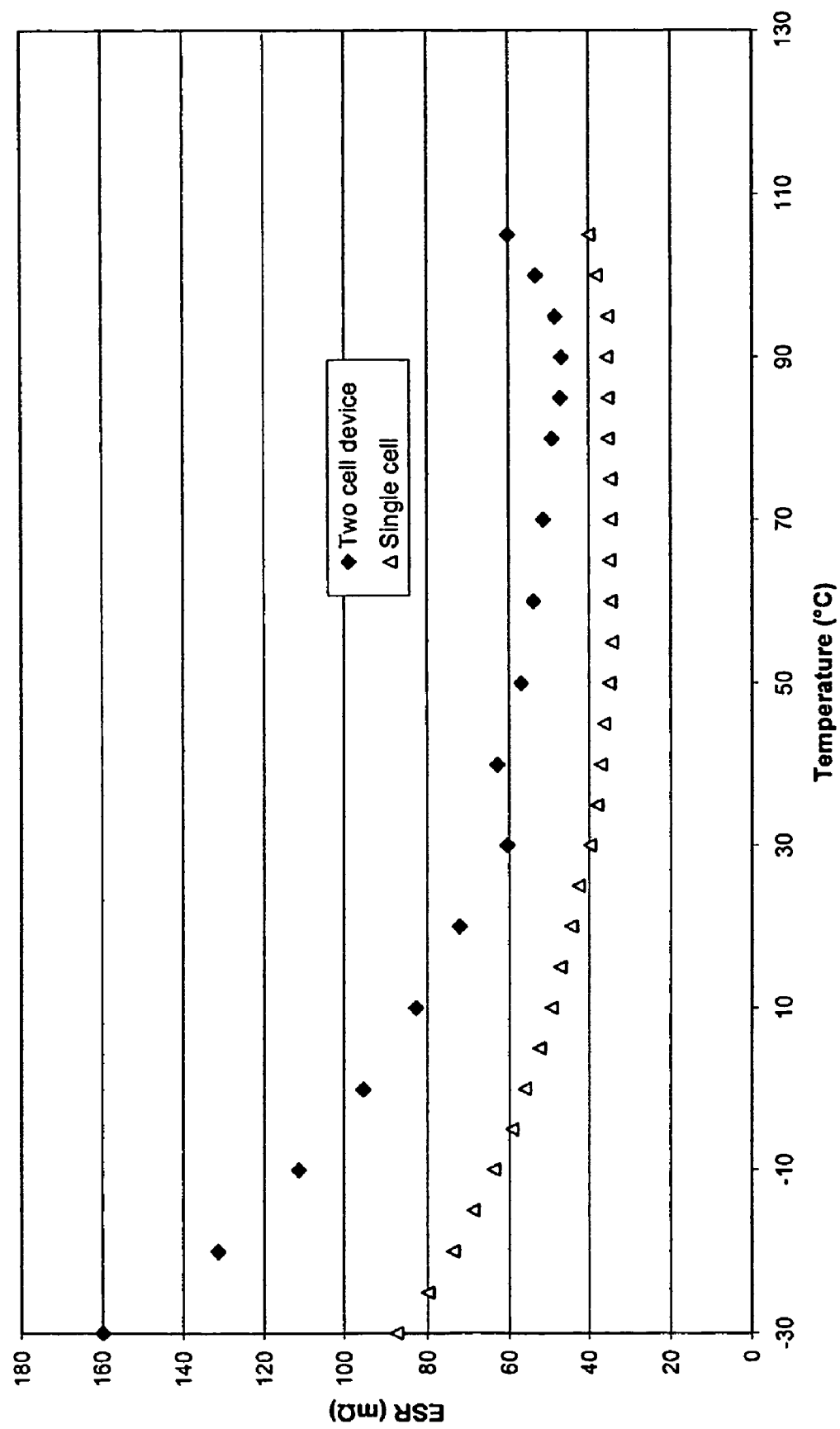
FIG. 13 shows ESR verses temperature for a multiple layered electrode stack in a single cell and also for two of these cells connected in series to form a two cell device. The electrolyte used was 1M TEATFB in 3AN:1.72GBL:EC. The separator was nominally 50 μm thick.
Figure 14:
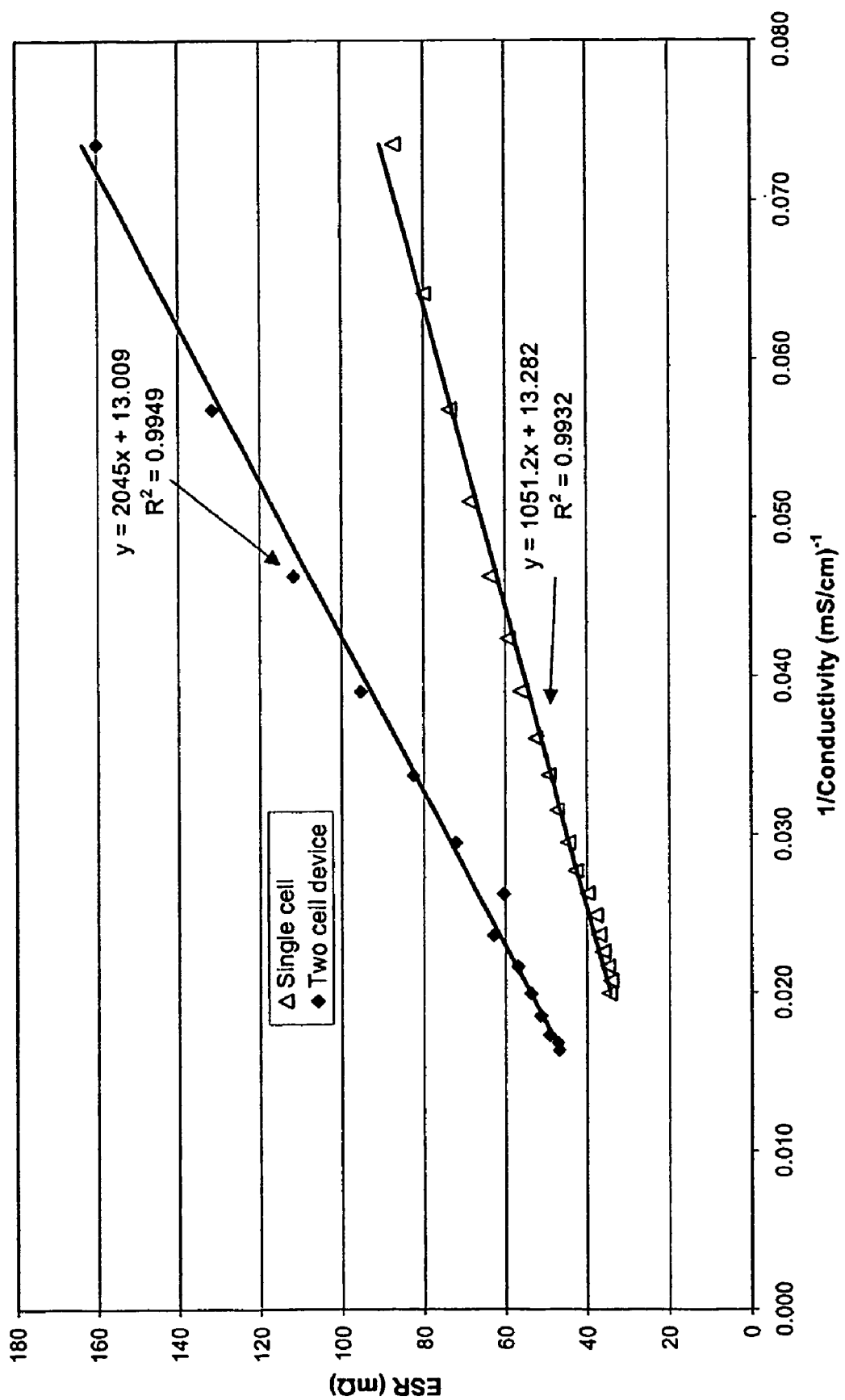
FIG. 14 shows ESR verses 1/conductivity for a multiple layered electrode stack in a single cell and also for two of these cells connected in series to form a two cell device. The electrolyte used was 1M TEATFB in 3AN:1.72GBL:EC. The separator was nominally 50 μm thick.
Figure 15:
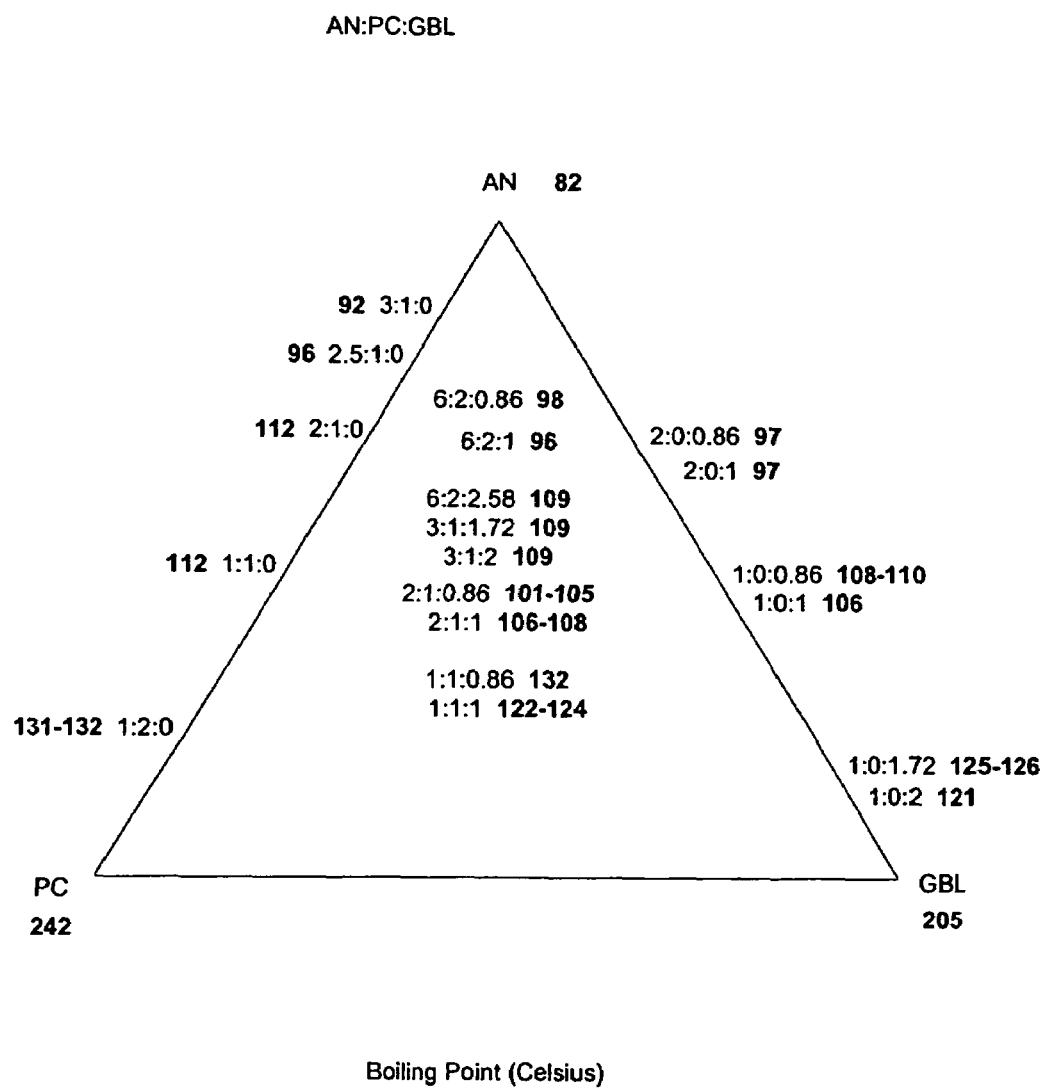
FIGS. 15 to 26 show phase diagrams for electrolyte mixtures. The phase diagrams show the mole ratios of the solvent mixture. The property of that particular solvent mixture is represented in boldface text, in italics or underlined.
Figure 16:
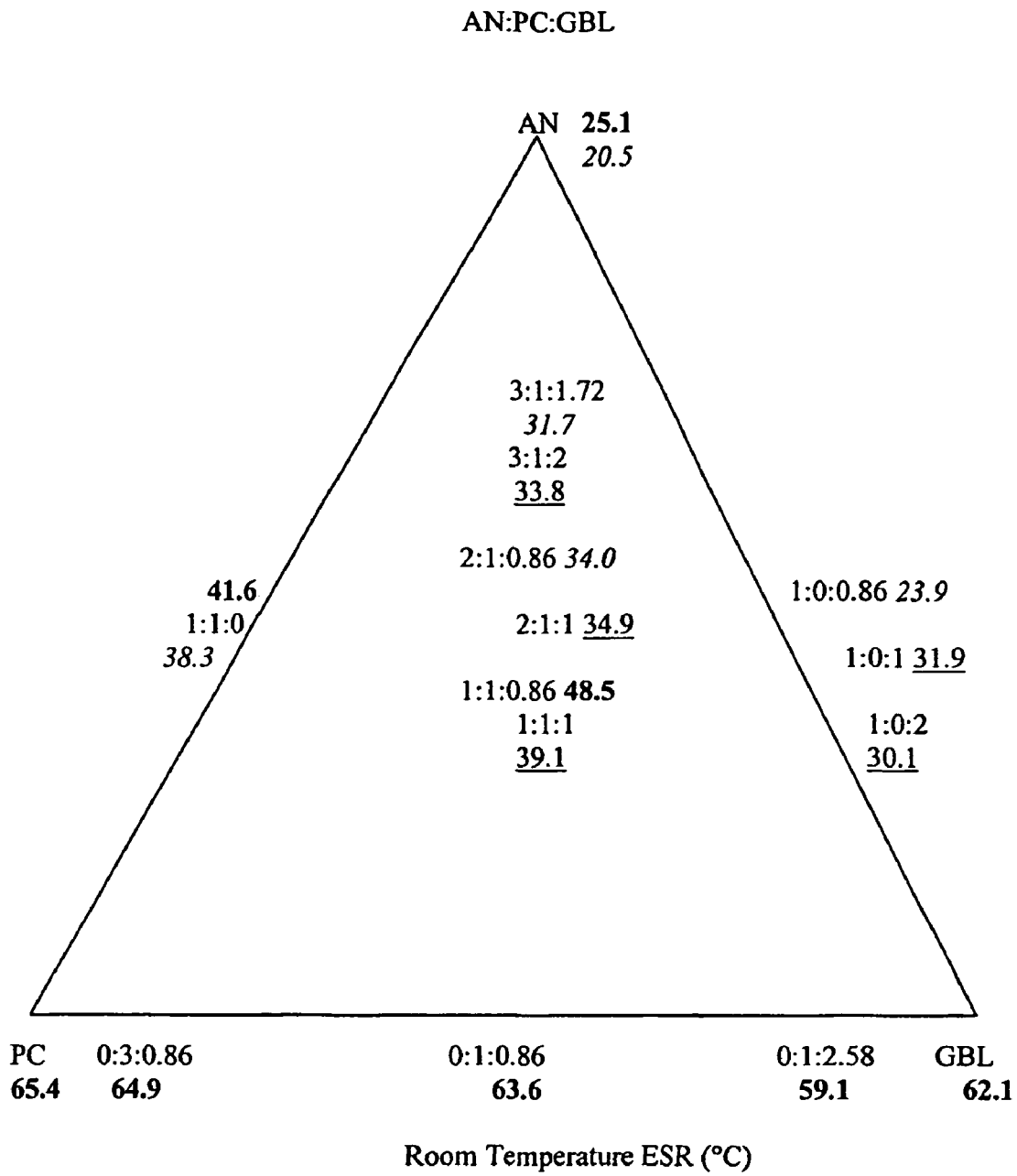
Figure 17:
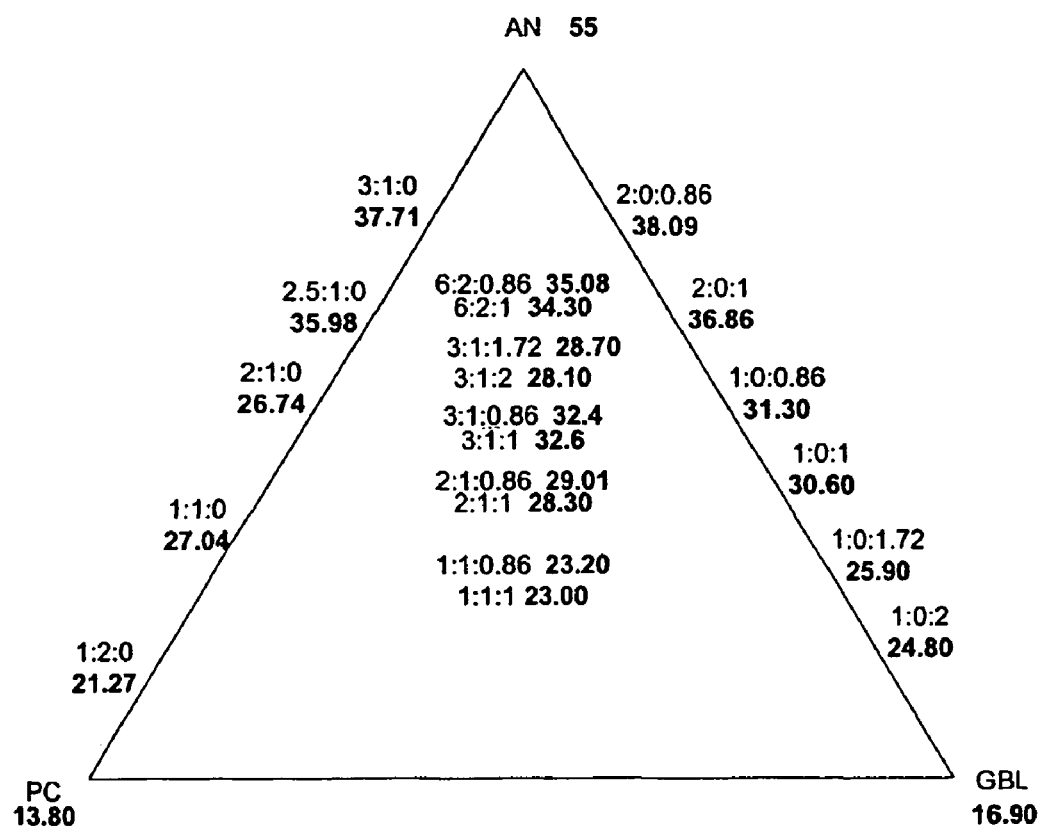
Figure 18:
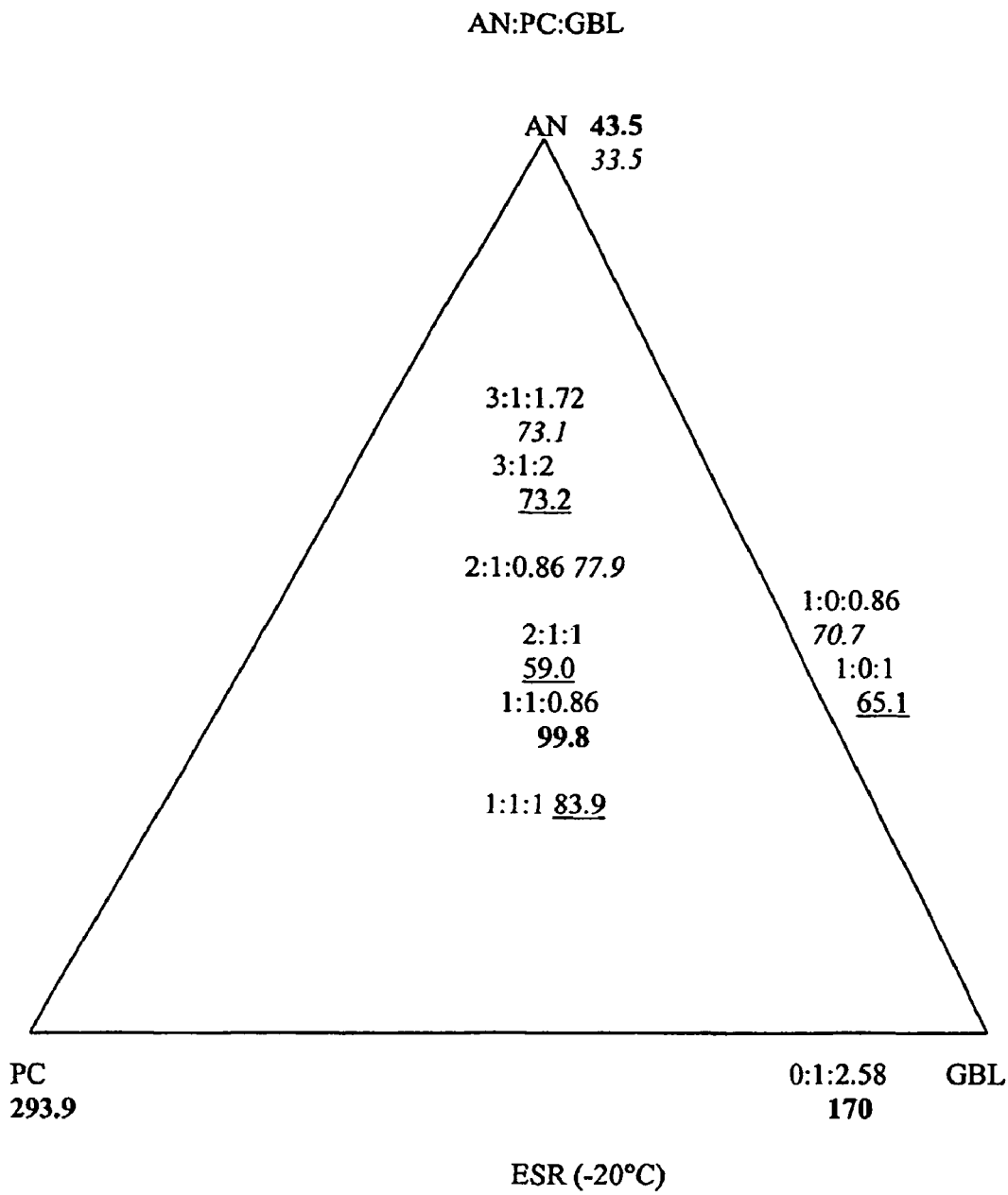
Figure 19:
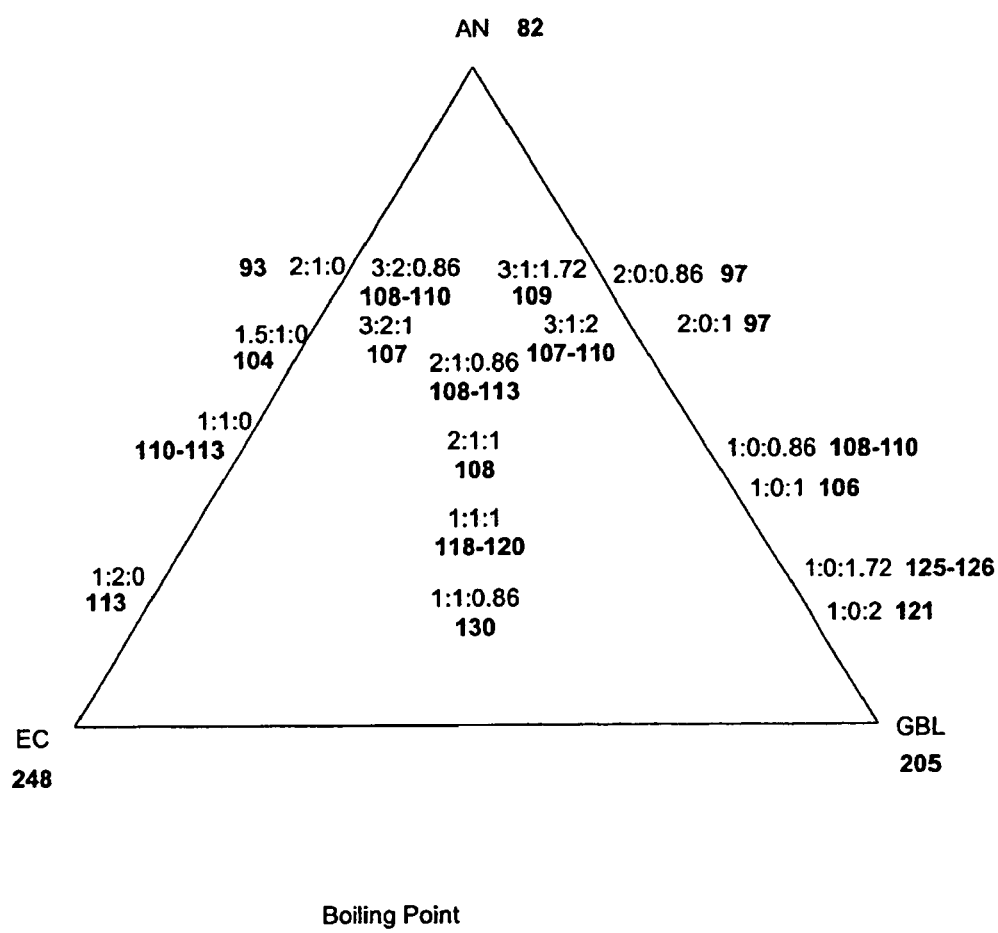
Figure 20:
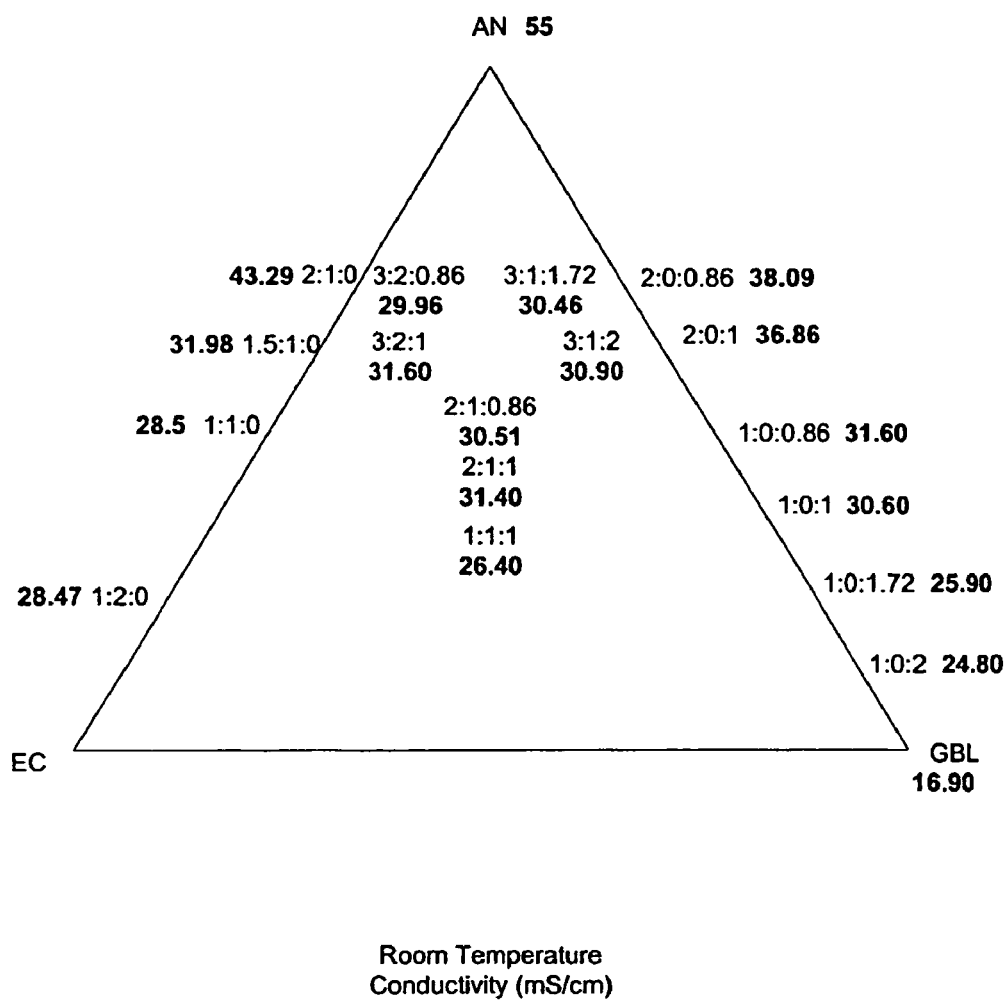
Figure 21:
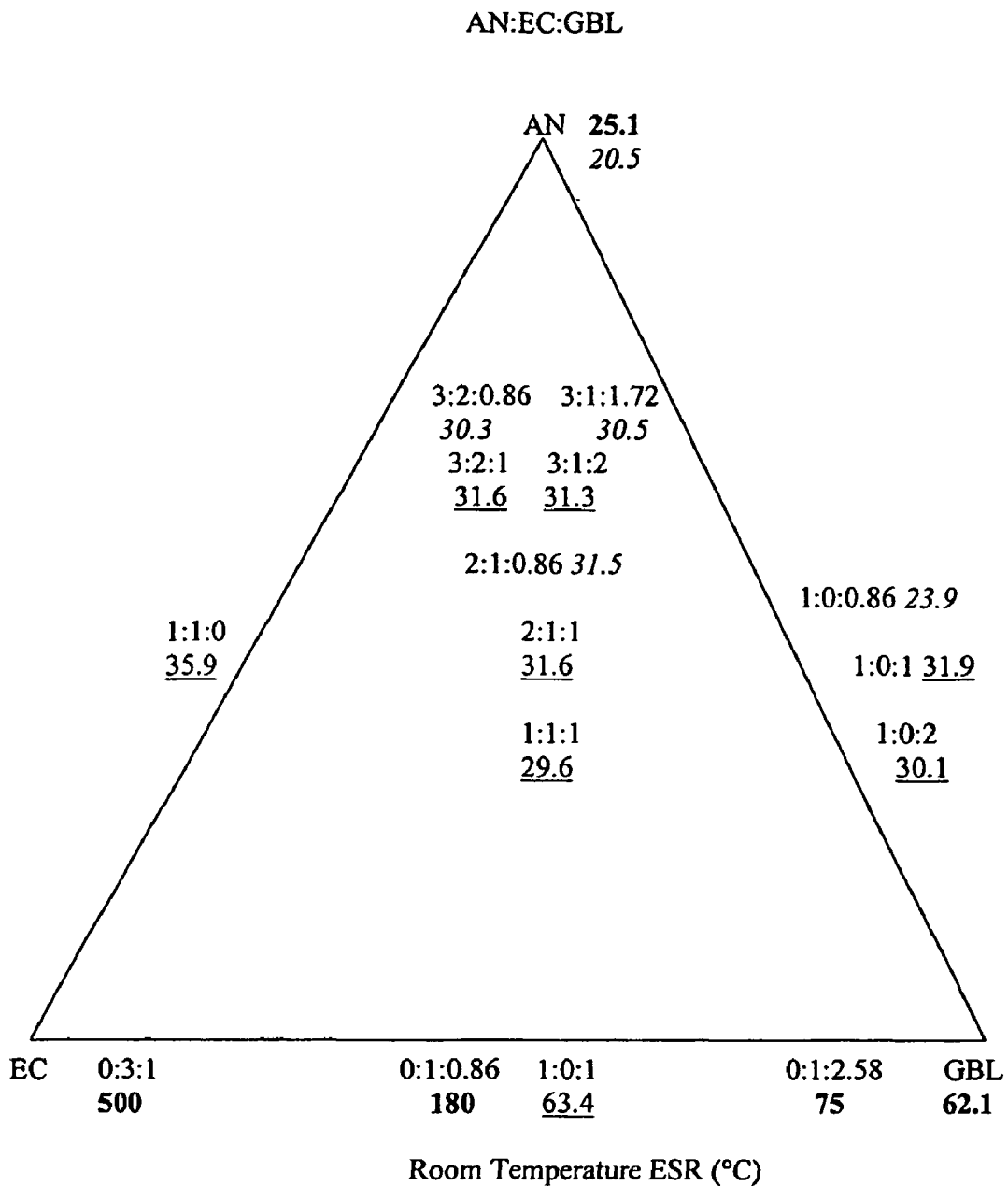
Figure 22:
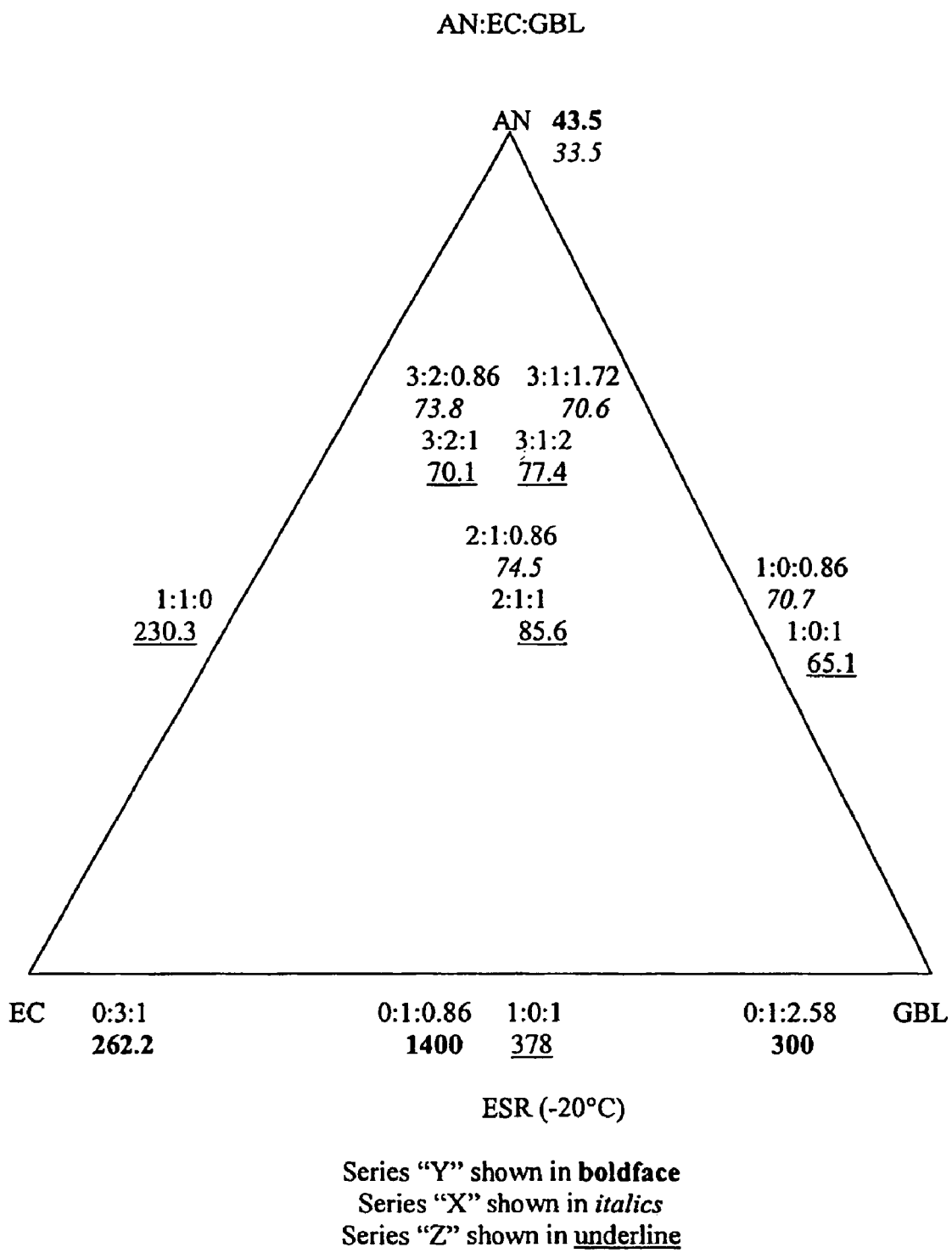
Figure 23:
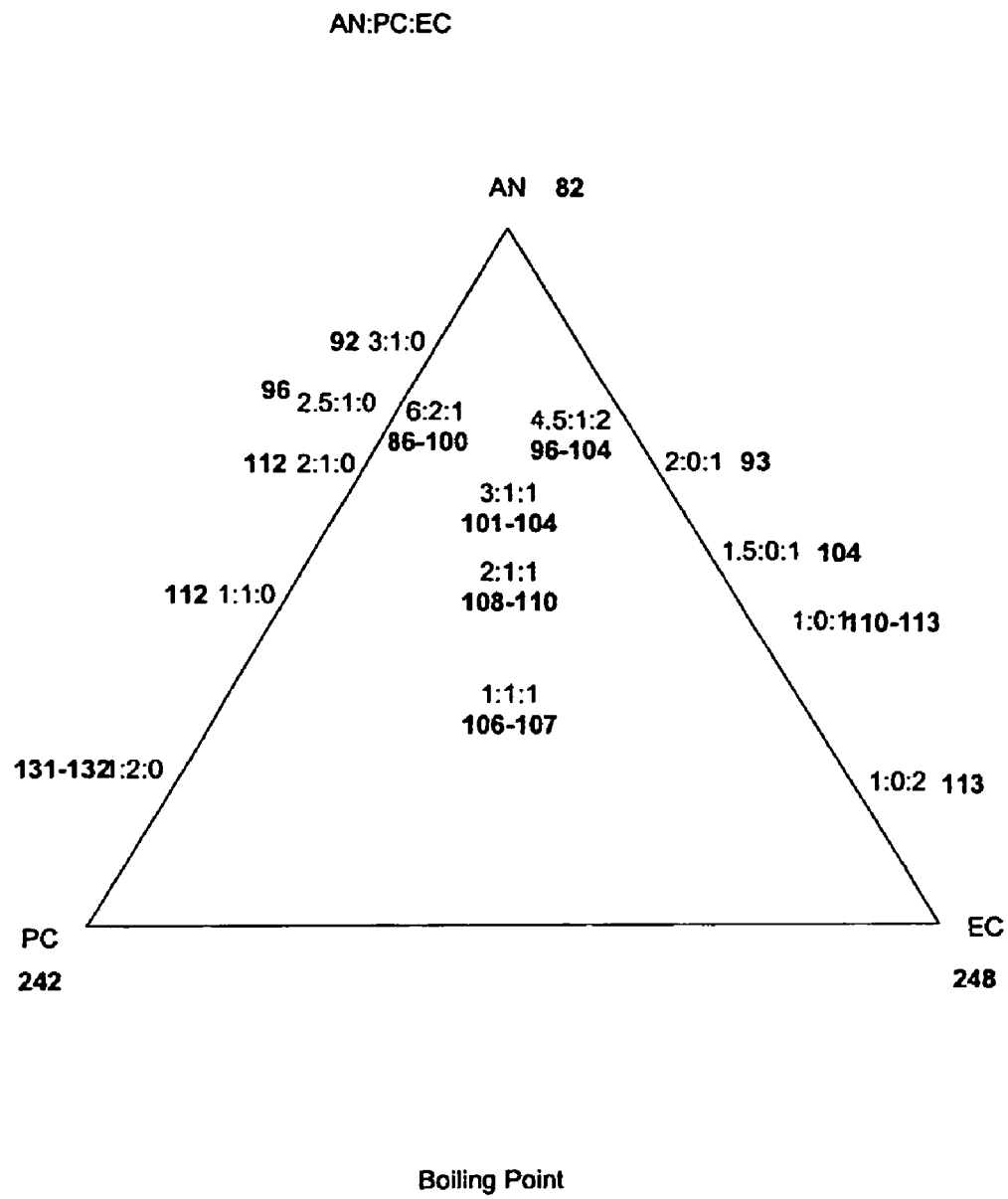
Figure 24:
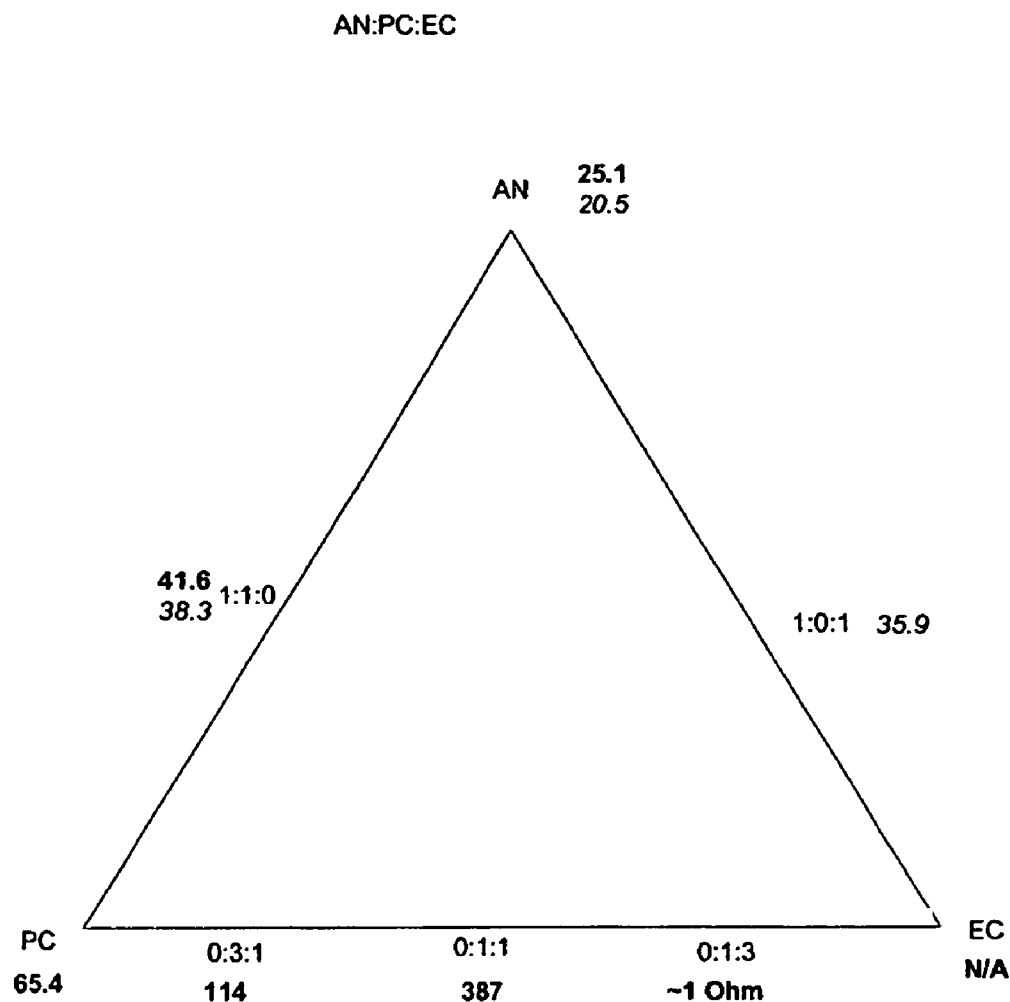
Figure 25:
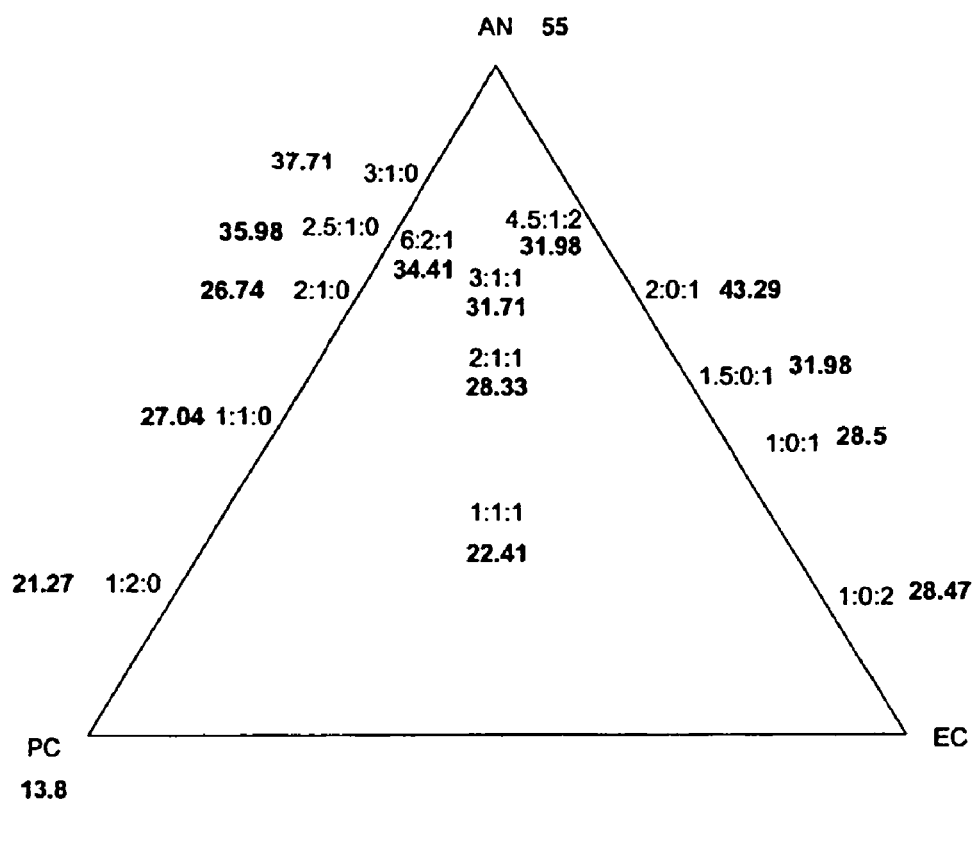
Figure 26:
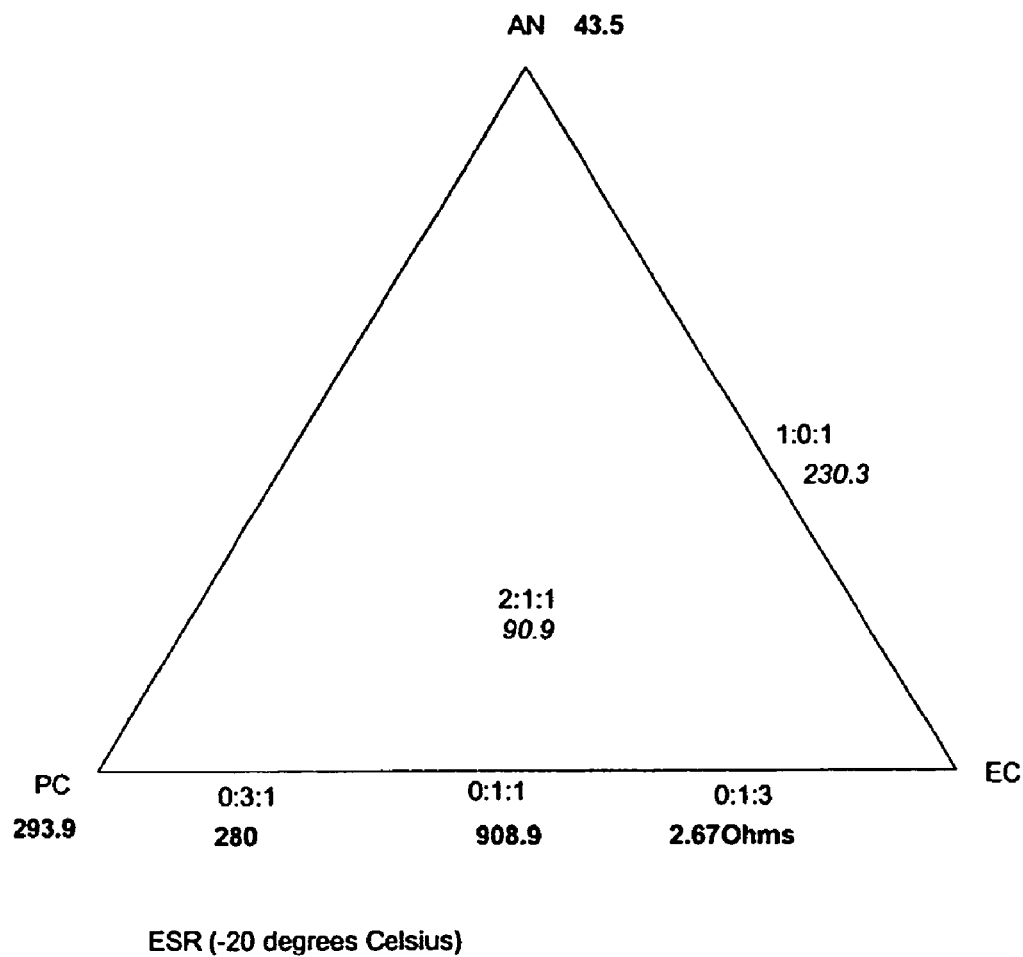

FIG. 9 Shows ESR against temperature while FIG. 11 shows 1/conductivity against ESR. The deviation in FIG. 9 at elevated temperatures is believed in that case to be due to a decrease in porosity of the separator at above 90° C. A decrease in porosity results in an increase in the resistivity of the separator.

In combination, FIGS. 8 to 11 illustrate that the solvent mixture of the present invention actually behaves in the same manner as a single solvent. Fractionating systems, with non-interacting components, would not provide the seamless electrochemical behaviour over such a wide temperature range and especially over a temperature range which includes the boiling point of AN, a major component of the mixture.

When measured in a 28 cm$^2$ test cell, ESR and temperature for the high temperature electrolyte 3AN:1.72GBL:EC were found to be related by the following equation:

$ESR=((1044.3/(0.3948*(T)+25.852))+6.5178)$ [50 μm Separator]

$ESR=((777.58/(0.3948*(T)+25.852))+6.741)$ [50 μm Separator, series z]

$ESR=((649.32/(0.3948*(T)+25.852))+8.7202)$ [20 μm Separator]

Where the, temperature T is in degrees Celsius and the ESR is in mΩ.

The relationship between ESR and temperature for AN (calculated) was also quantified and found to be:

$ESR=((1002.4/(0.4461*(T)+45.223))+5.2336)$ [50 μm Separator]

$ESR=((673.91/(0.4461*(T)+45.223))+6.7856)$ [20 μm Separator]

The equations were derived by plotting conductivity versus temperature and the inverse of conductivity versus ESR for each of the two solvents. A straight line fit was placed though each data set. The lines of best fit can be seen in FIGS. 8 and 11. The R$^2$ values for the curve fit was from about 0.96 to in excess of 0.99. The linear equations were then equated using the assumption that the conductivities are equal at any given temperature. The formula was then rearranged so as to be given in terms of ESR vs. temperature. The ESR can then be multiplied by the area of the smallest opposed electrode (or the area of mutual overlap between electrodes, if there is some offset) to give a value of ESR cm$^2$. The more general equation is written thus:

$ESR=(((1044.3/(0.3948*(T)+25.852))+6.5178)*28)$ [50 μm Separator]

$ESR=(((777.58/(0.3948*(T)+25.852))+6.741)*28)$ [50 μm Separator, Series Z]

$ESR=(((649.32/(0.3948*(T)+25.852))+8.7202)*28)$ [20 μm Separator]

$ESR=(((1002.4/(0.4461*(T)+45.223))+5.2336)*28)$ [50 μm Separator]

$ESR=(((673.91/(0.4461*(T)+45.223))+6.7856)*28)$ [20 μm Separator]

where the units for the above equations are: mΩ cm$^2$

Figure 7:
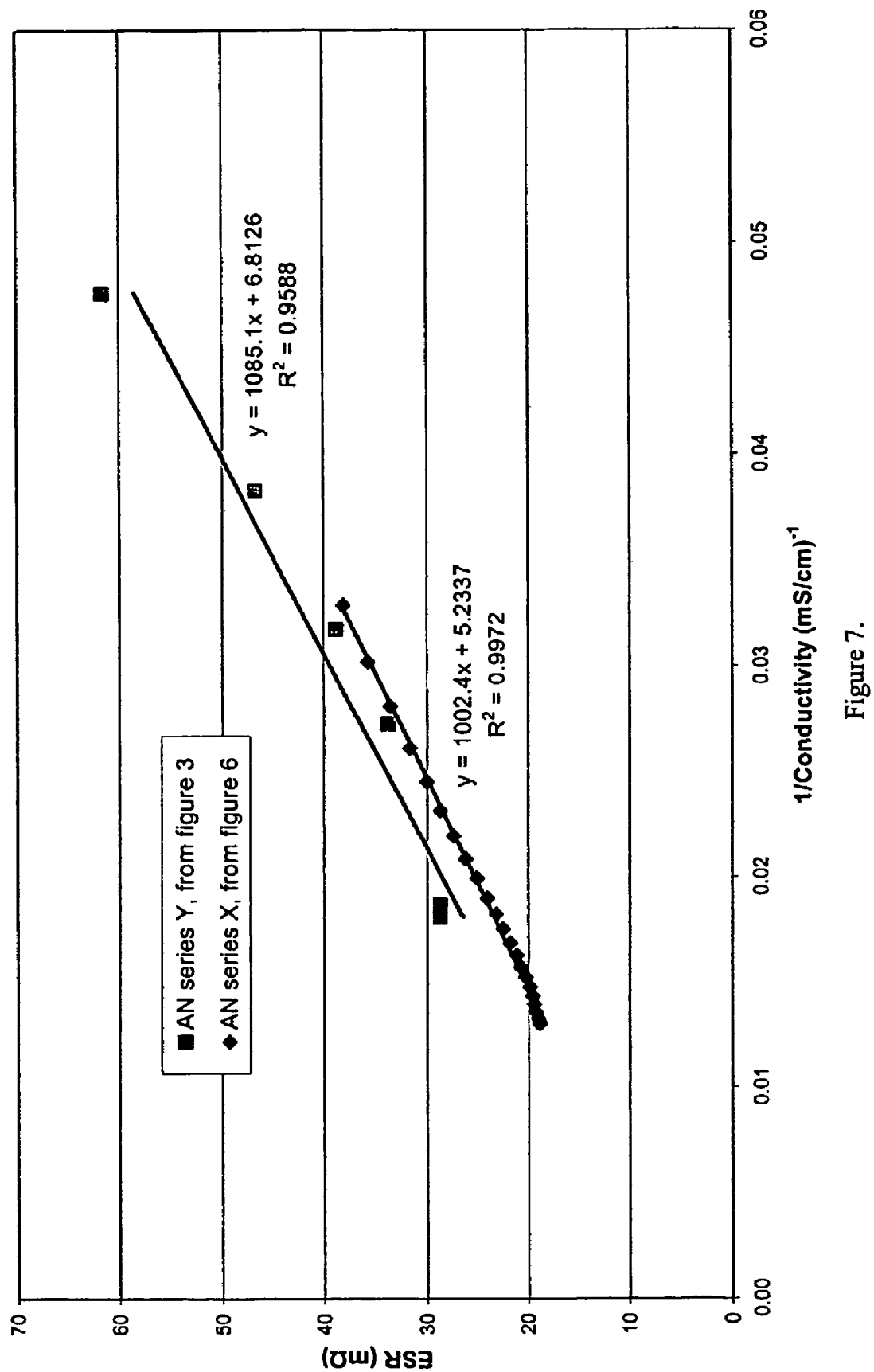
FIG. 7 collates FIGS. 6 and 3 to allow comparison of the concentration and temperature effects.

The plot in FIG. 11 can also be used to extrapolate an ESR value at a point where 1/conductivity equals zero, ie ESR at infinite conductivity. Using the lines of best fit from FIG. 11, for the AN series X line an ESR at infinite conductivity, ESR$_\infty$=5.2336 mΩ, or when adjusted for area, 147 mΩ cm$^2$. Similarly, for AN series Y (FIG. 7), ESR$_\infty$=6.823 mΩ, or when adjusted for area, 191 mΩ cm$^2$. The ESR$_\infty$ from the 3AN:1.72GBL:EC line was 6.741 mΩ, or when adjusted for area, 189 mΩ cm$^2$. ESR$_\infty$ is a useful parameter for comparing devices.

Similar equations can be constructed for other electrolyte systems, and for differing cell constructions. For example, FIGS. 7, 9, 11, 13 and 14 illustrate differences in observed values which are effected by supercapacitor construction.

For example, in a standard test cell as disclosed above, the variation in separator thickness attributed to moving between a 20 μm separator and a 50 μm separator.

| 50 μm Separator | |
|---|---|
| Electrolyte | Equation |
| 1M AN Series X | ESR = (((1002.4/(0.4461 * T + 45.223)) + 5.2336) * 28)mΩ cm$^2$ |
| 1M 3AN:2GBL:EC Series Z | ESR = (((646.94/(0.4009 * T + 22.646)) + 8.8613) * 28)mΩ cm$^2$ |
| 1M 3AN:1.72GBL:EC (1) Series Z (2) Series X | (1) ESR = (((777.58/(0.3948 * (R4) + 25.852)) + 6.741) * 28) mΩ cm$^2$ (2) ESR = (((1044.3/(0.3948 * (N4) + 25.852)) + 6.5178) * 28) mΩ cm$^2$ |

| 20 μm Separator | |
|---|---|
| Electrolyte | Equation |
| 1M AN Series Z | ESR = (((673.91/0.4461 * T + 45.223)) + 6.7856) * 28) mΩ cm$^2$ |
| 1M 3AN:2GBL:EC Series Z | ESR = (((501.19/(0.4009 * T + 22.646)) + 9.9452) * 28) mΩ cm$^2$ |
| 1M 3AN:1.72GBL:EC Series Z | ESR = (((649.32/(0.3948 * (B4) + 25.852)) + 8.7202) * 28) mΩ cm$^2$ |

| 1M 3AN:1.72GBL:EC Multiple Layered Electrode Stack Cells | |
|---|---|
| Single cell: | ESR = (((1051.2/(0.3948 * (T) + 25.852)) + 13.282) * 24.4) mΩ cm$^2$ |
| Two cells connected in series: | ESR = (((2045/(0.3948 * (T) + 25.852)) + 13.009) * 48.8) mΩ cm$^2$ |

The boiling point of the electrolyte with 3AN:1.72GBL:EC or 3AN:2GBL:EC ternary solvent system was found to be significantly higher than that of AN alone. This electrolyte system also had good conductivity at the high and low ends of the temperature range of interest.

Based on the boiling point and performance in the test cell, an extensive analysis of the results revealed that the 1M TEATFB in 3AN:1.72GBL:EC—3AN:2GBL:EC was the preferred choice and this electrolyte solution was prepared to use in further testing.

By way of example, the following shows the method of calculation of the actual values used for the production of electrolyte as follows:

$$3\,AN:\ 1.72GBL:\ EC \equiv 3\times41.05\ g\ AN(1\ \text{Molar}\ TEATFB):\ 1.72\times86.09$$
$$g\ GBL(0.92\ \text{Molar}\ TEATFB):\ 88\ g\ EC(0\ \text{Molar}\ TEATFB) =$$
$$123.15\ g\ AN:\ 148.08\ g\ GBL:\ 88\ g\ EC\ \text{Total volume} \sim 352.6\ ml$$

Extra salt (TEATFB) added ~15.876 g to make total salt concentration in mixture to 1 Molar TEATFB.

The moisture in this electrolyte was removed by putting approximately 100 g of γ alumina into this electrolyte and stirring well for one minute. The alumina was allowed to settle before being filtered out.

The final moisture found in the electrolyte was measured through Karl Fischer titration to be ~16 ppm.

Stability results

The stability of multilayer soft packaging laminate devices of the present invention was tested by thermogravimetric analysis in a DMT-Thermo Balance under a flowing air atmosphere. For this test the cells take the form of a multiple layered electrode stacks.

Temperature was ramped at 0.1° C. per minute from ambient temperature.

Figure 27:
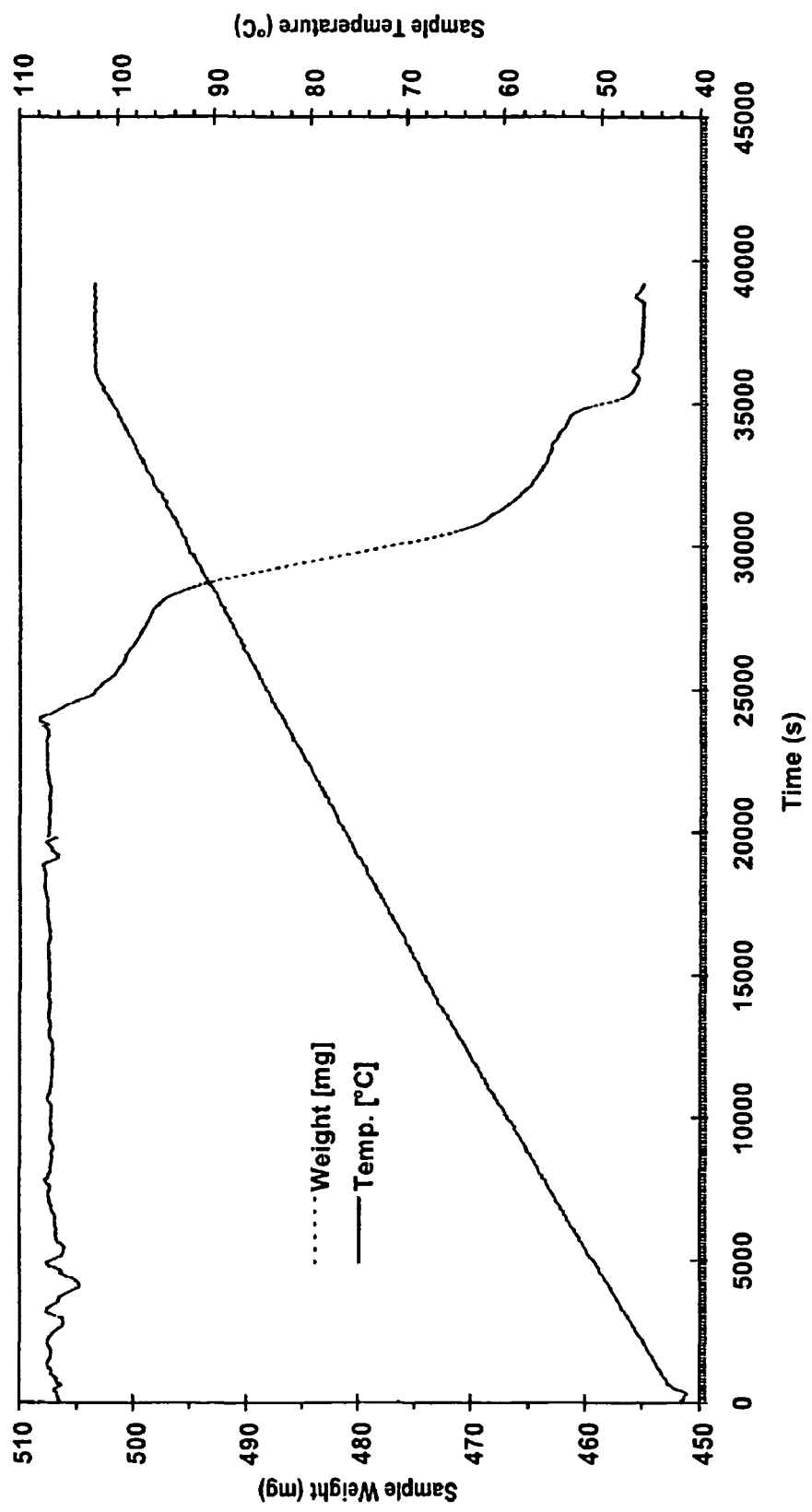
FIGS. 27 and 28 show thermogravimetric analysis of a multilayered soft packaging laminate supercapacitor cell with prior art electrolyte (acetonitrile). The cell in this figure takes the form of a multiple layered electrode stack.
Figure 28:
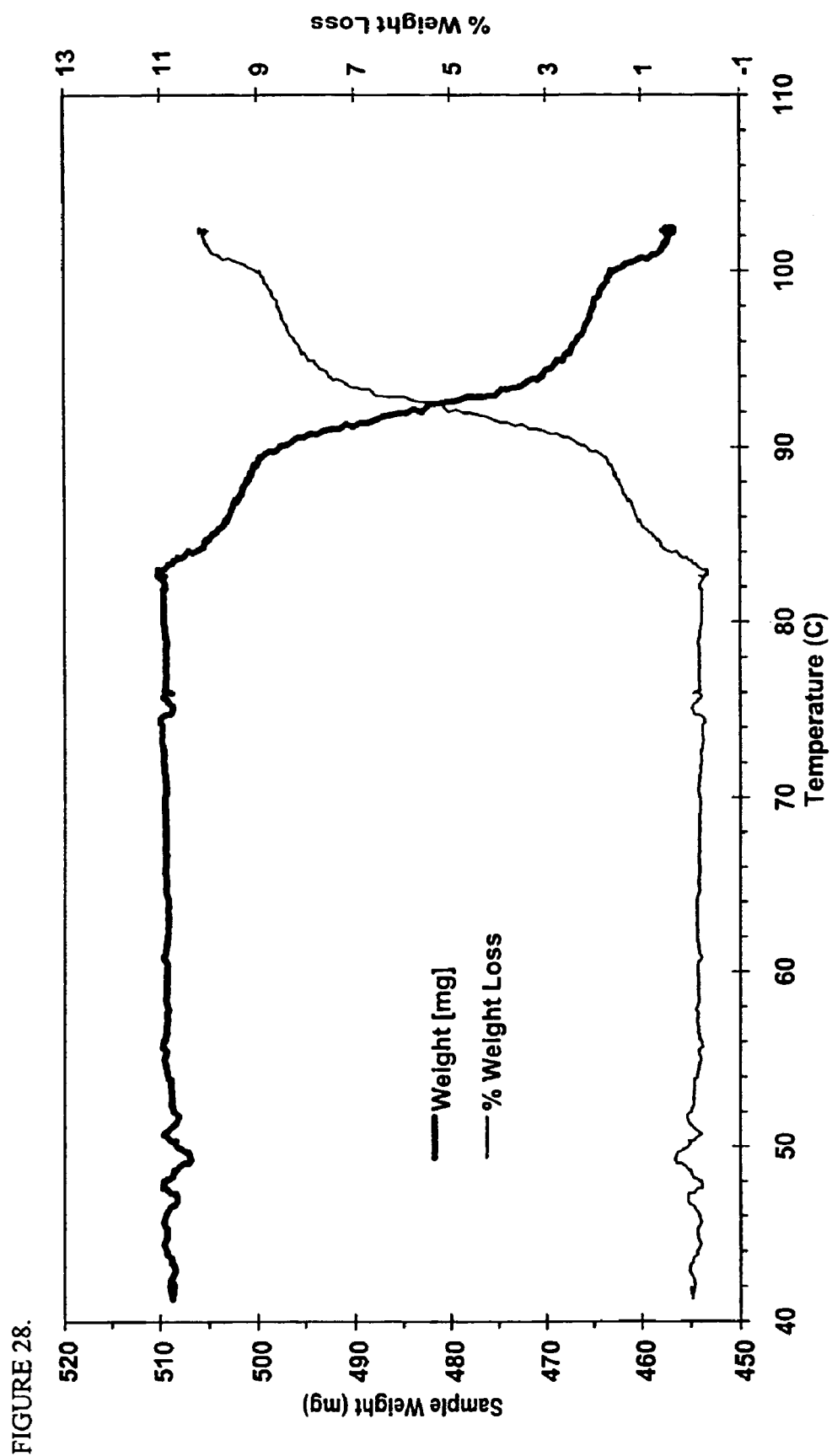
Figure 29:
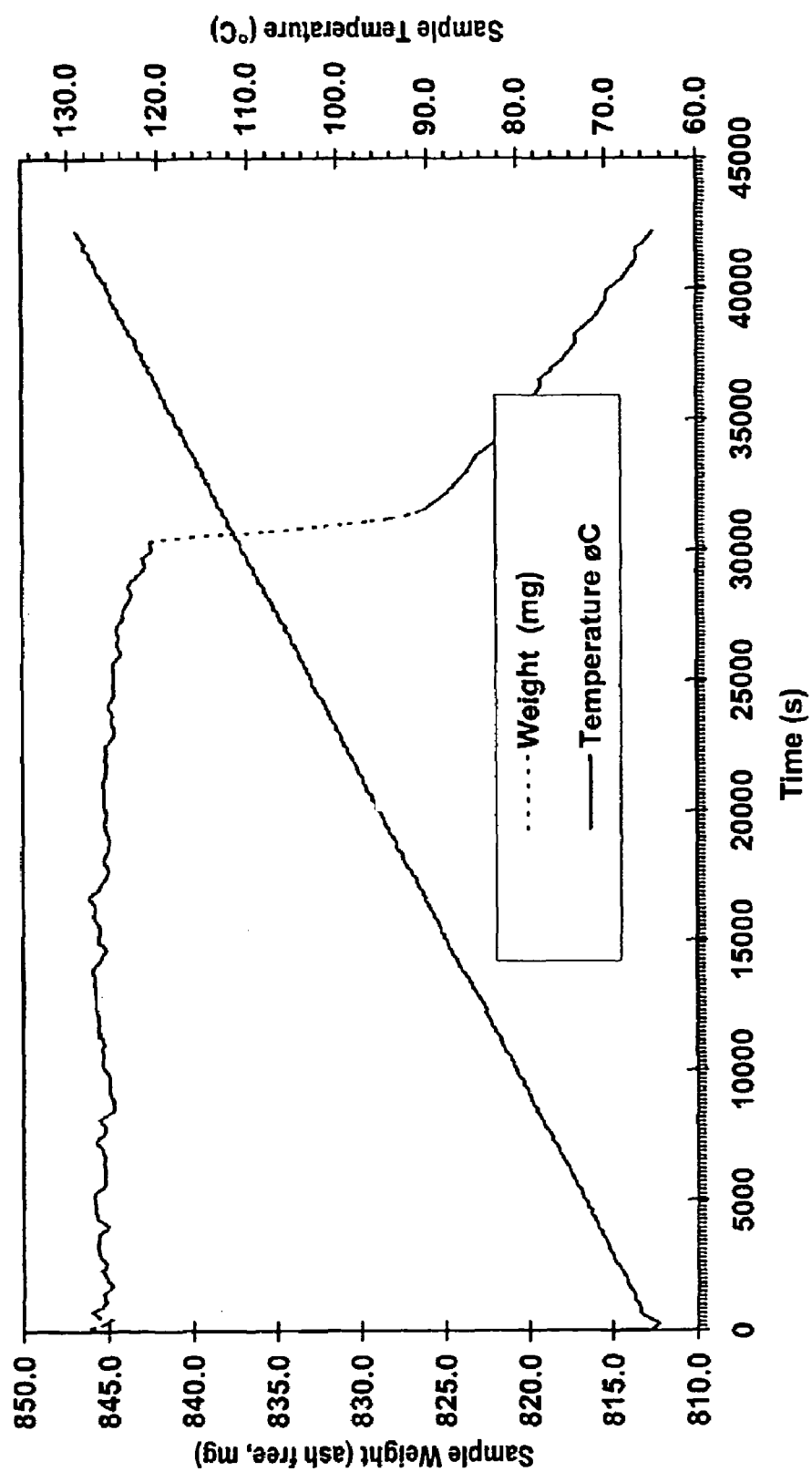
FIGS. 29 and 30 show thermogravimetric analysis of a multilayered soft packaging laminate supercapacitor cell with an electrolyte of the present invention (3AN:1.72GBL:EC). The cell in this figure takes the form of a multiple layered electrode stack
Figure 30:
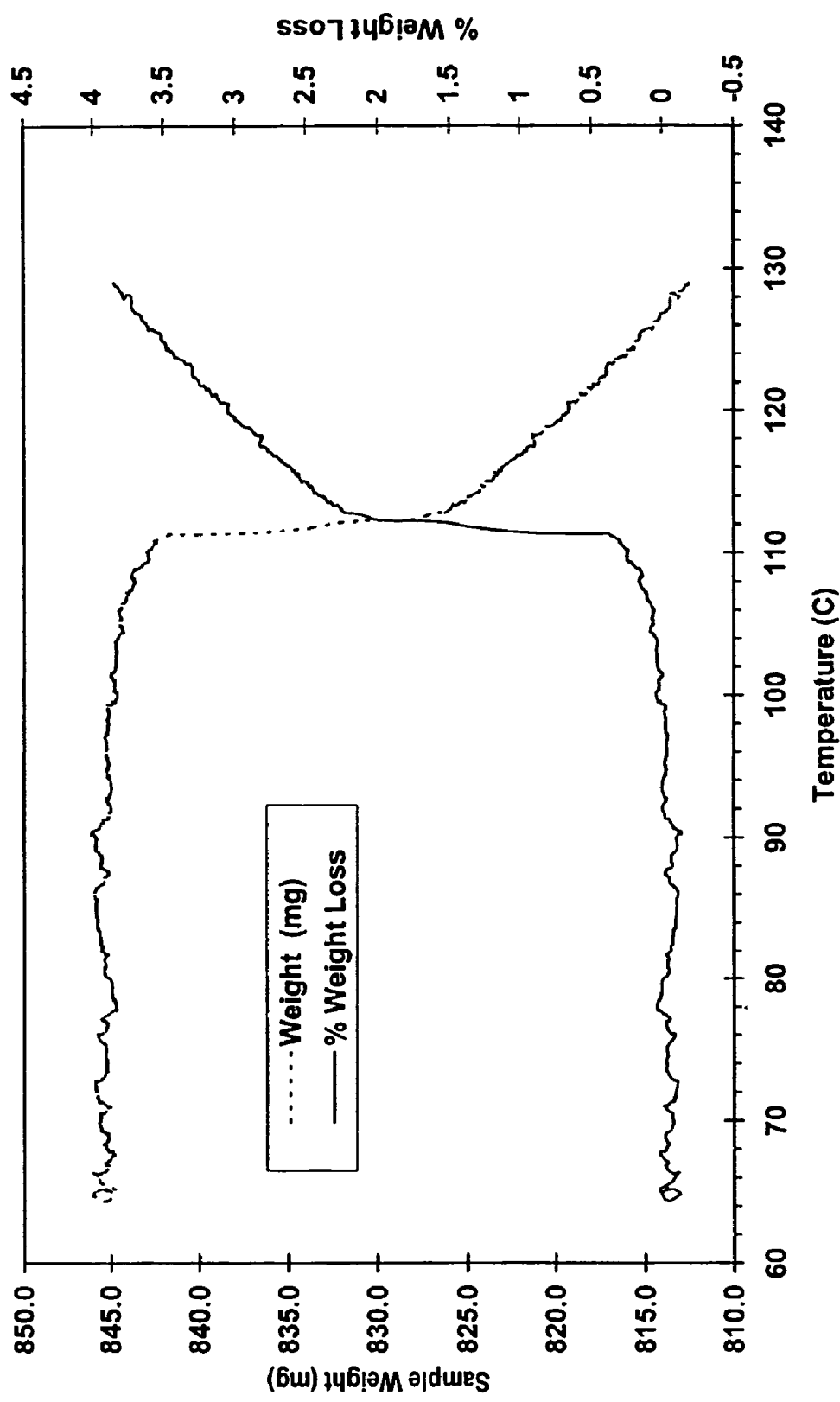
Figure 31:
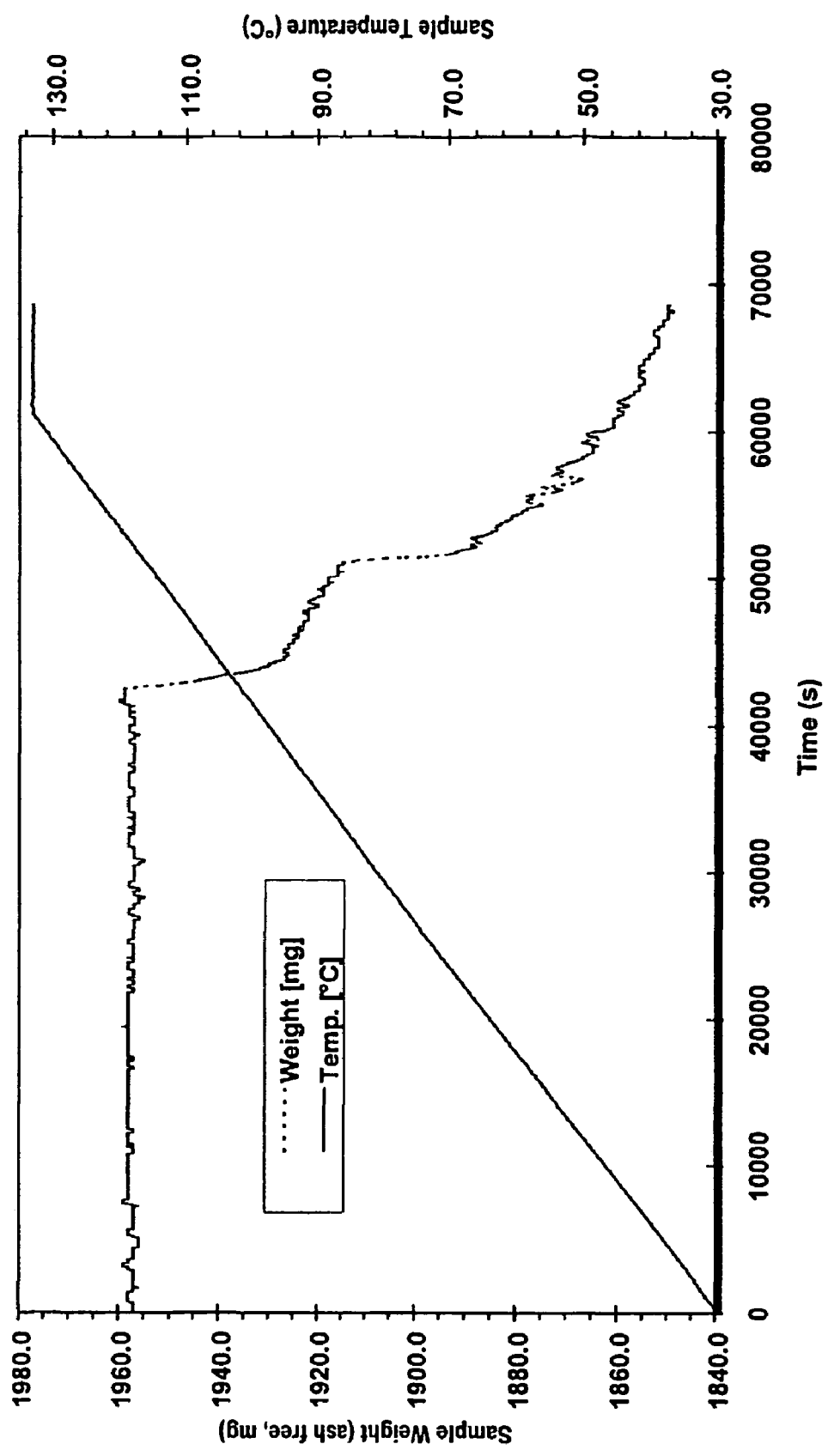
FIGS. 31 and 32 show thermogravimetric analysis of a multilayered soft packaging laminate supercapacitor device with an electrolyte of the present invention.
Figure 32:
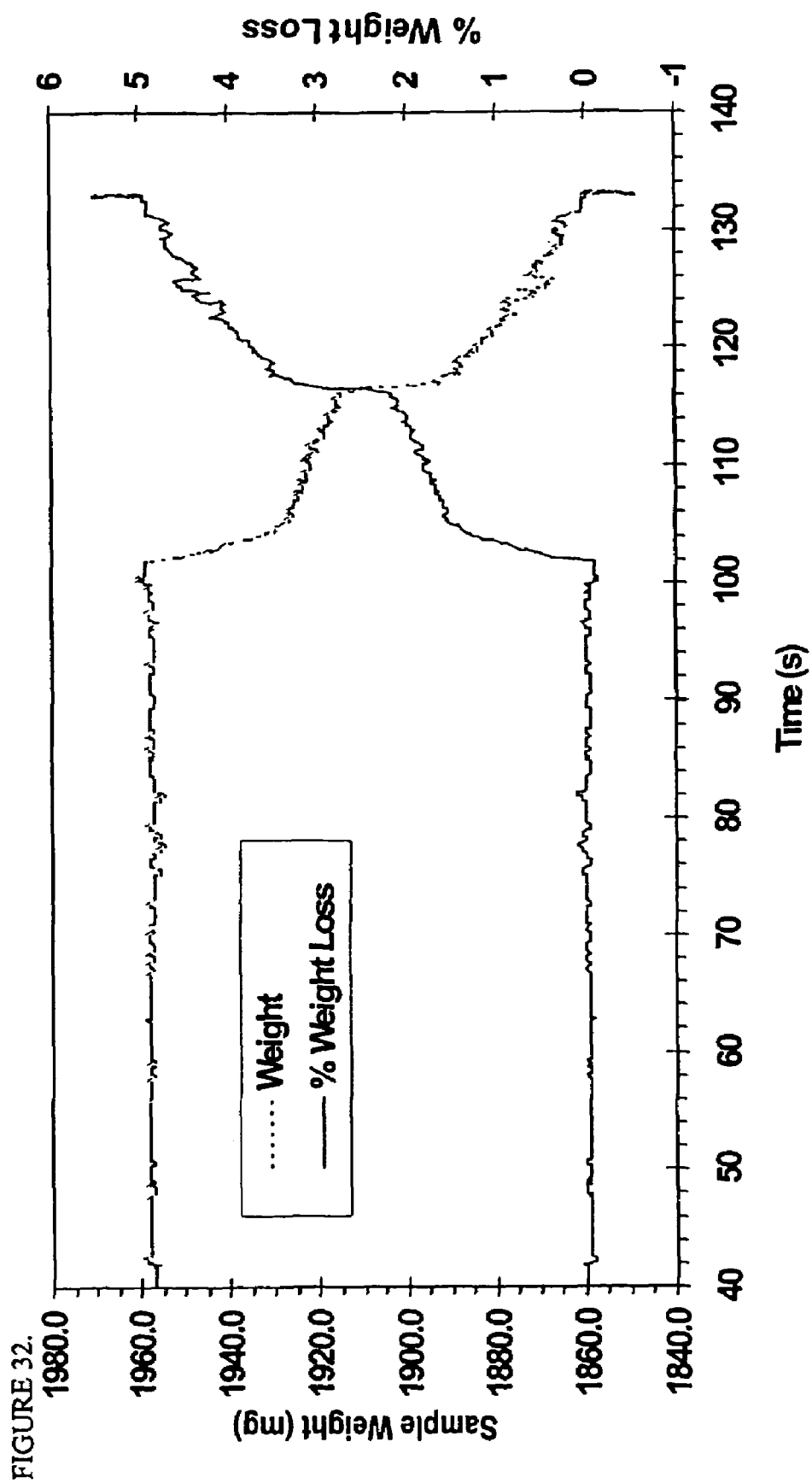

The TGA shows the acetonitrile-only capacitors venting electrolyte solvent occurs between 83° C. and 86° C., see FIGS. 27 and 28 which show the TGA results, including temperature and weight loss profiles. By contrast, the supercapacitor cells, FIGS. 29 and 30, and devices, FIGS. 31 and 32, of the present invention having 3AN:1.72GBL:EC solvent systems showed no loss until over about 100° C.

In combination with the low ESR over a wide temperature range, the TGA stability demonstrates the suitability of the solvents systems of the present invention to provide stable devices with desirable power windows over a wide temperature range.

SUMMARY

As stated earlier, the objective of the present applicants was to determine an electrolyte which would be stable at elevated temperatures whilst retaining a usable ESR at lower temperatures (at least −20° C.). Initially this was thought to be unrealisable when using acetonitrile, as the boiling point of acetonitrile is only 82° C. Trials were performed and an unusual and unprecedented trend was seen—devices with mixtures of acetonitrile managed to survive a period of time at temperatures greater than or equal to 85° C. Apparently, a boiling point elevation phenomenon was being achieved.

There are two non-limiting theories on how this boiling point elevation could be realised. The first is that the elevation is a manifestation of the effect of salt in a solution. This is a well-established theory. The boiling point elevation due to salt is generally of the range of ~1-3° C. per mole of ionic species in solution. The second explanation is that there is complexation or association between the solvents which leads to an increase in boiling point.

An experiment to distinguish between these explanations was conducted using one mixture with and without salt. Select results have been reproduced below.

| Solution | Boiling Point ° C. |
|---|---|
| 2AN:0.86GBL:EC + 1M TEATFB | 108-113 |
| 2AN:0.86GBL:EC (Solvent only) | 107 |
| AN (solvent only) | 82 |

It can be seen from the results above that the effect of adding salt to the 2AN:0.86GBL:EC mixture is to increase boiling point by about 1-6° C. That is up to 3° C. per mole of ionic species. This is within the theoretical limits of what has previously been seen on the addition of salt.

By contrast the difference between the mixture of 2AN:0.86GBL:EC and the pure acetonitrile is 25° C. If the mixture is not an actual solution then one would expect to see some fractionation at 82° C. The fact that this is not seen implies that there is indeed a solvation effect on the acetonitrile.

Hence it implies that, whilst the addition of salt does raise the boiling point somewhat, the main boiling point elevation is due to the mixture effect.

While the invention has been illustrated with TEATFB, any other soluble salts may be used, eg Lithium, Sodium, Potassium salts and the like. The following table shows the boiling point elevations observed in a 3AN:2GBL:EC mixture incorporating alternative electrolyte salts.

Boiling Point of Alternative Salts in 3AN:2GBL:EC

| Salt in 3AN:2GBL:EC | Boiling point (° C.) |
|---|---|
| Solvent only | 104-106 |
| 1M Tetrabutylammonium Perchlorate | 107 |
| 1M Tetrabutylammonium Tetrafluoroborate | 105-107 |
| 1M Tetrabutylammonium Hexafluorophosphate | 107 |
| 1M Triethylmethylammonium Tetrafluoroborate | 108 |
| 0.5M Lithium Tetrafluoroborate | 106 |

The ternary phase diagrams summarise the results of room temperature conductivity, room temperature ESR, ESR at low temperatures and boiling point elevation for solvent mixtures of acetonitrile, propylene carbonate and ethylene carbonate; acetonitrile, propylene carbonate and γ-butyrolactone; and acetonitrile, ethylene carbonate and γ-butyrolactone.

Figure 33:
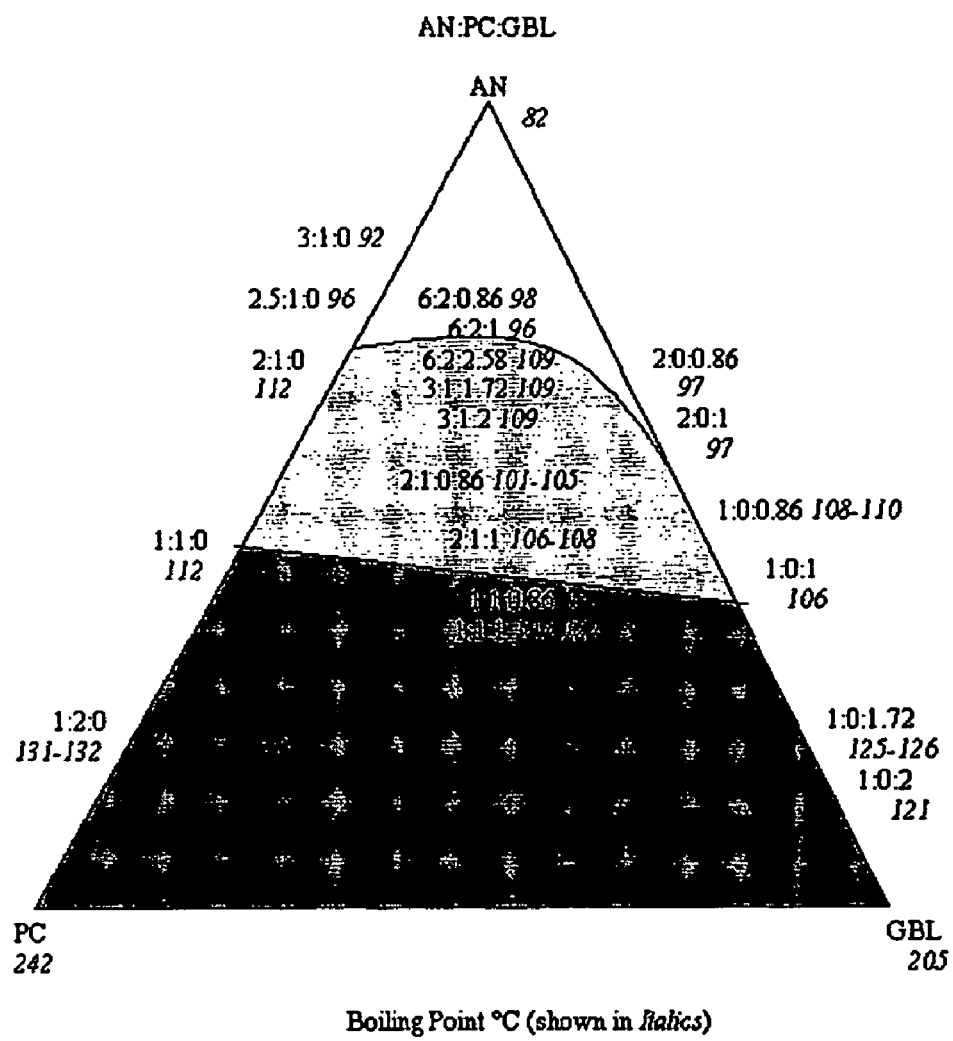
FIG. 33 shows a contour plot of boiling points for AN:PC:GBL ratios.

FIG. 33 shows how the trends in a value of a particular property, eg boiling point, may be evaluated. By creating a "contour plot" in which experimental date of equal value (ie equal boiling point) are joined, it becomes possible to predict other intermediate solvent compositions which may have that boiling point, or determine which other compositions may have a suitable boiling temperature. While this has been exemplified for boiling point elevation in AN:PC:GBL, those skilled in the art will appreciate that it can be applied equally to other solvent systems, and to other properties which depend upon the composition of the electrolyte, such as ESR and conductivity.

Figure 2:
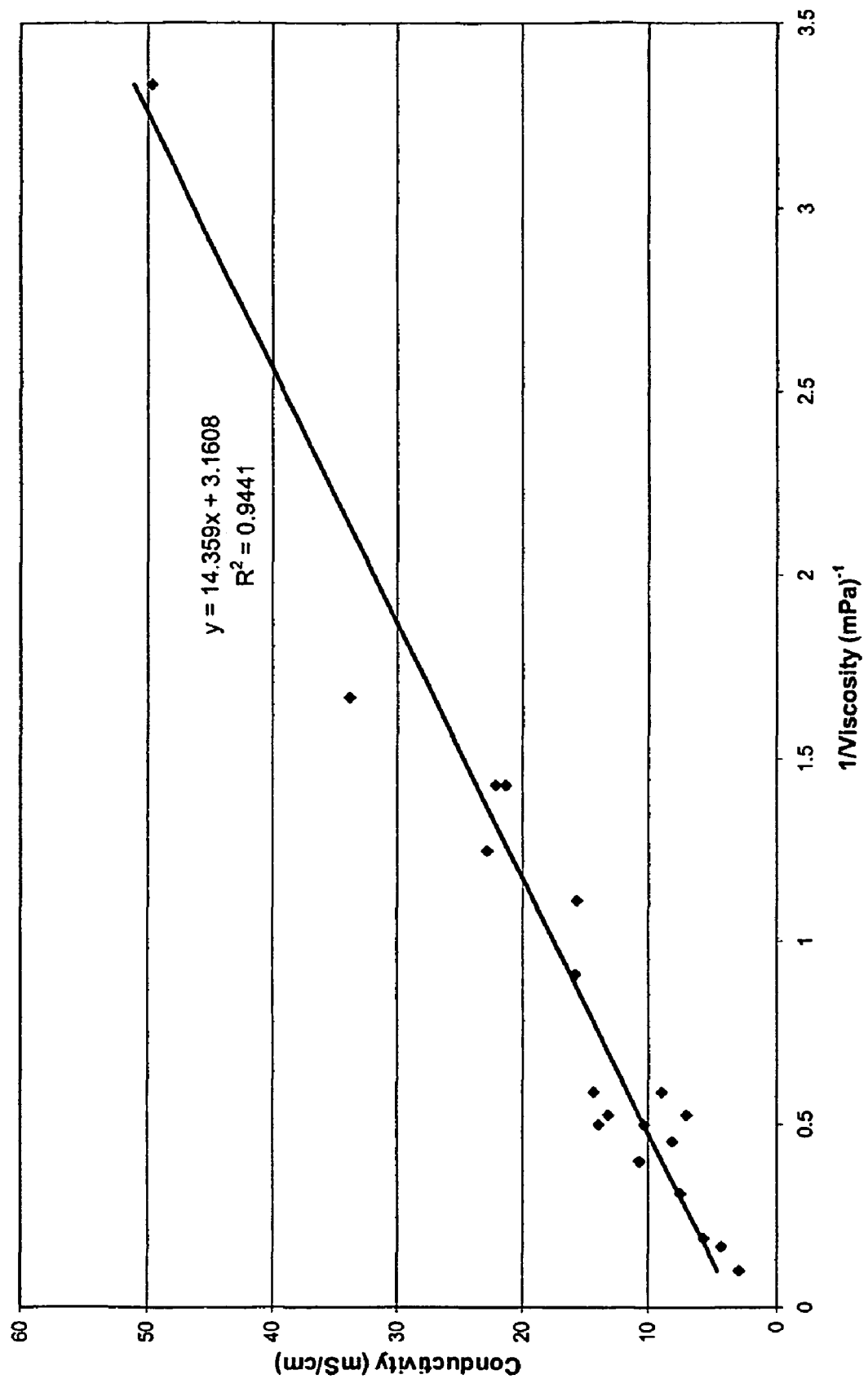
FIG. 2 shows a graph of conductivity against 1/viscosity for a range of solvents.
Figure 3:
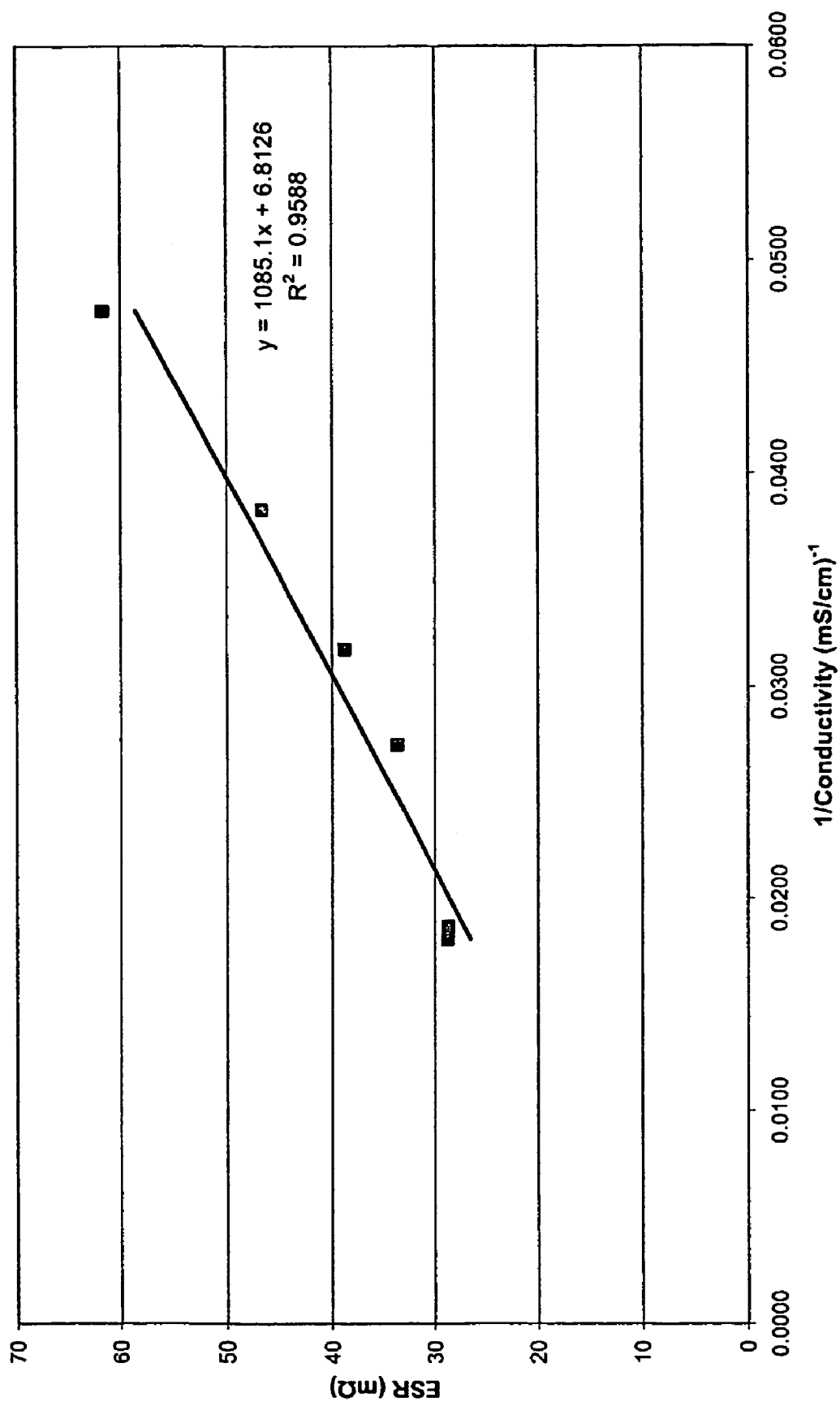
FIG. 3 shows a graph of ESR against 1/conductivity (as a function of TEATFB concentration at 23° C.) for Series Y standard test cells with acetonitrile.

The ternary phase diagrams clearly show that the attempt to find a high temperature electrolyte is a trade off between high boiling point/high viscosity (and resultant low conductivity) on the one hand and high conductivity with a low boiling point on the other. Unfortunately the ultra high temperature electrolytes have low conductivity because they have a high viscosity, as discussed in the introduction and shown in FIGS. 1 to 3.

The unexpected synergy of the solvent components, apparently as a result of complexation, allows for the selection of electrolyte solvents which have a better performance profile over a wide range of components than would be predicted from looking at the component solvents alone.

The invention claimed is:

1. A non-aqueous solvent system suitable for use as an electrolyte solvent in an energy storage device, said non-aqueous solvent system including, by molar ratios 1 part carbonate, 2 to 3 parts acetonitrile and 0.43 to 2 parts γ-butyrolactone, and wherein the carbonate is selected from the group consisting of ethylene carbonate and propylene carbonate.

2. A non-aqueous solvent system according to claim 1 including, by molar ratios: 3 parts acetonitrile;1.72 to 2 parts γ-butyrolactone; and 1 part ethylene carbonate.

3. A non-aqueous solvent system according to claim 1 including by molar ratios: 3 parts acetonitrile; 1.72 to 2 parts γ-butyrolactone; and 1 part propylene carbonate.

* * * * *

UNITED STATES PATENT AND TRADEMARK OFFICE
CERTIFICATE OF CORRECTION

PATENT NO. : 7,314,514 B2  Page 1 of 1
APPLICATION NO. : 10/508158
DATED : January 1, 2008
INVENTOR(S) : Drummond et al.

It is certified that error appears in the above-identified patent and that said Letters Patent is hereby corrected as shown below:

On Page 1, Item 75 (Inventors), after the name of the third-named inventor, the following fourth inventor should be inserted:

-- Rory Albert James Pynenburg, Ridgefield, WA (US) --

Signed and Sealed this

Twentieth Day of April, 2010

David J. Kappos
*Director of the United States Patent and Trademark Office*